US012512678B2

(12) United States Patent
Chen et al.

(10) Patent No.: US 12,512,678 B2
(45) Date of Patent: Dec. 30, 2025

(54) POWER SUPPLY SYSTEM AND METHOD FOR CONTROLLING OUTPUT VOLTAGE OF DIRECT CURRENT COMBINER BOX

(71) Applicant: Huawei Digital Power Technologies Co., Ltd., Shenzhen (CN)

(72) Inventors: Dong Chen, Shanghai (CN); Yongbing Gao, Shanghai (CN); Lei Shi, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 92 days.

(21) Appl. No.: 18/474,453

(22) Filed: Sep. 26, 2023

(65) Prior Publication Data

US 2024/0014664 A1   Jan. 11, 2024

Related U.S. Application Data

(63) Continuation of application No. PCT/CN2022/082084, filed on Mar. 21, 2022.

(30) Foreign Application Priority Data

Mar. 30, 2021   (CN) .......................... 202110339587.9

(51) Int. Cl.
*H02J 3/38* (2006.01)
*H02J 3/46* (2006.01)
(Continued)

(52) U.S. Cl.
CPC ................ *H02J 3/381* (2013.01); *H02J 3/46* (2013.01); *H02M 1/007* (2021.05);
(Continued)

(58) Field of Classification Search
CPC .......... H02J 3/381; H02J 3/46; H02J 2300/24; H02J 3/38; H02M 1/007; H02M 1/0077;
(Continued)

(56) References Cited

U.S. PATENT DOCUMENTS

| 2012/0043818 | A1 | 2/2012 | Stratakos et al. | |
| 2014/0001864 | A1* | 1/2014 | Nirantare | H02J 1/10 307/71 |
| 2014/0070815 | A1* | 3/2014 | Liu | G01R 31/52 324/510 |
| 2016/0329715 | A1 | 11/2016 | Orr et al. | |

(Continued)

FOREIGN PATENT DOCUMENTS

| CN | 206099366 U | 4/2017 |
| CN | 109193610 A | 1/2019 |

(Continued)

OTHER PUBLICATIONS

Smalley, J. (Jun. 30, 2015). What is a combiner box?. Solar Power World. https://www.solarpowerworldonline.com/2015/06/what-is-a-combiner-box/ (Year: 2015).*

*Primary Examiner* — Daniel Cavallari
(74) *Attorney, Agent, or Firm* — Maier & Maier, PLLC

(57) ABSTRACT

A power supply system includes direct current combiner boxes and an inverter, where output terminals of all direct current combiner boxes are connected in series and/or in parallel and then coupled to an input terminal of the inverter, and the direct current combiner box includes a controller, a detection circuit, and a direct current conversion circuit. The direct current conversion circuit performs direct current conversion on an input terminal voltage of the direct current combiner box to obtain an output terminal voltage of the direct current combiner box. The detection circuit detects an output terminal parameter of the direct current combiner box, and sends the output terminal parameter of the direct current combiner box to the controller. The controller controls an output voltage of the direct current conversion circuit based on the output terminal parameter of the direct current combiner box.

20 Claims, 8 Drawing Sheets

(51) Int. Cl.
*H02M 1/00* (2006.01)
*H02M 1/36* (2007.01)
*H02M 3/00* (2006.01)
*H02M 7/48* (2007.01)
*H02M 7/493* (2007.01)

(52) U.S. Cl.
CPC ........... *H02M 1/0077* (2021.05); *H02M 1/36* (2013.01); *H02M 3/00* (2013.01); *H02M 7/48* (2013.01); *H02M 7/493* (2013.01); *H02J 2300/24* (2020.01)

(58) Field of Classification Search
CPC ............ H02M 1/36; H02M 3/00; H02M 7/48; H02M 7/493
See application file for complete search history.

(56) References Cited

U.S. PATENT DOCUMENTS

| | | | | |
|---|---|---|---|---|
| 2018/0131193 | A1* | 5/2018 | Zhao | H02J 13/00017 |
| 2021/0135455 | A1* | 5/2021 | Marinopoulos | H02S 40/32 |
| 2022/0115873 | A1* | 4/2022 | Yu | H02M 1/007 |
| 2022/0206522 | A1* | 6/2022 | Gu | H02S 40/32 |
| 2023/0378908 | A1* | 11/2023 | Lin | H02J 3/381 |
| 2023/0396057 | A1* | 12/2023 | Zhang | H02J 3/381 |
| 2024/0014682 | A1* | 1/2024 | Lu | H02J 1/106 |
| 2025/0141400 | A1* | 5/2025 | Olsen, Jr. | H02M 3/00 |

FOREIGN PATENT DOCUMENTS

| | | | | |
|---|---|---|---|---|
| CN | 109787213 A | | 5/2019 | |
| CN | 112952907 A | | 6/2021 | |
| DE | 102018127132 A1 | * | 4/2020 | ............. H02M 7/48 |
| EP | 2232663 B1 | | 11/2018 | |

* cited by examiner

POWER SUPPLY SYSTEM AND METHOD FOR CONTROLLING OUTPUT VOLTAGE OF DIRECT CURRENT COMBINER BOX

CROSS-REFERENCE TO RELATED APPLICATIONS

This application is a continuation of International Application No. PCT/CN2022/082084, filed on Mar. 21, 2022, which claims priority to Chinese Patent Application No. 202110339587.9, filed on Mar. 30, 2021. The disclosures of the aforementioned applications are hereby incorporated by reference in their entireties.

TECHNICAL FIELD

The embodiments relate to the field of electronic circuit technologies, a power supply system, and a method for controlling an output voltage of a direct current combiner box.

BACKGROUND

Currently, as shown in FIG. 1a, a power supply system includes a plurality of direct current power supplies, a plurality of direct current combiner boxes, and an inverter. An input terminal of each direct current combiner box is connected to at least one direct current power supply, an output terminal of each direct current combiner box is connected to the inverter, and each direct current combiner box is configured to perform direct current conversion on a direct current of the at least one direct current power supply connected to the input terminal of the direct current combiner box and then output the converted direct current to the inverter.

As shown in FIG. 1a, in a manner of controlling an output voltage of a direct current combiner box, the inverter sends a communication signal to the direct current combiner box, and the direct current combiner box controls the output voltage of the direct current combiner box based on the received communication signal, to start the direct current combiner box and provide electric energy for the inverter. However, the foregoing manner has the following problem: If it is difficult for the direct current combiner box to communicate with the inverter (for example, a communication link is abnormal such as absorption or occlusion of the communication signal, or the inverter cannot send the communication signal without obtaining the electric energy), the direct current combiner box fails to start and work normally, and consequently stability of the power supply system is poor.

SUMMARY

The embodiments may provide a power supply system and a method for controlling an output voltage of a direct current combiner box. A direct current combiner box may determine a connection relationship between the direct current combiner box and another direct current combiner box or an inverter based on an output terminal parameter of the direct current combiner box, and then may control an output voltage of the direct current combiner box based on the connection relationship, to ensure that the direct current combiner box can start and work normally even if it is difficult to communicate with the inverter, thereby improving stability of the power supply system and having high applicability.

According to a first aspect, the embodiments may provide a power supply system. The power supply system includes at least one direct current combiner box and an inverter, output terminals of all direct current combiner boxes in the at least one direct current combiner box are connected in series and/or in parallel and then coupled to an input terminal of the inverter, an input terminal of each direct current combiner box is connected to a direct current power supply, and the direct current combiner box includes a controller, a detection circuit, and a direct current conversion circuit, where an input terminal of the direct current conversion circuit is coupled to the input terminal of the direct current combiner box, an output terminal of the direct current conversion circuit is coupled to the output terminal of the direct current combiner box, and the direct current conversion circuit is configured to perform direct current conversion on an input terminal voltage of the direct current combiner box to obtain an output terminal voltage of the direct current combiner box. The detection circuit detects an output terminal parameter of the direct current combiner box, and sends the output terminal parameter of the direct current combiner box to the controller. The controller controls an output voltage of the direct current conversion circuit based on the output terminal parameter of the direct current combiner box. Therefore, the direct current combiner box may determine a connection relationship between the direct current combiner box and another direct current combiner box or the inverter based on the output terminal parameter, and control the output voltage of the direct current conversion circuit based on the connection relationship, to ensure that the direct current combiner box can start and work normally even if it is difficult to communicate with the inverter, thereby improving stability of the power supply system and having high applicability.

With reference to the first aspect, in a first possible implementation, the controller determines an output impedance value of the direct current combiner box based on an output terminal current of the direct current combiner box and a first preset voltage, and when the output impedance value of the direct current combiner box is greater than a preset output impedance threshold, determines that the direct current combiner box is connected to the inverter, and then controls the output voltage of the direct current conversion circuit to be adjusted from the first preset voltage to a second preset voltage.

With reference to the first aspect, in a second possible implementation, the first preset voltage is a direct current voltage, an alternating current voltage, or a direct current voltage and an alternating current voltage. Further, when the first preset voltage is a direct current voltage, the direct current combiner box may obtain an impedance value of a resistive part in the output impedance value of the direct current combiner box through calculation; when the first preset voltage is an alternating current voltage, obtain an impedance value of a capacitive part and an impedance value of an inductive part in the output impedance value of the direct current combiner box through calculation; or when the first preset voltage is a direct current voltage and an alternating current voltage, obtain an impedance value of a resistive part, an impedance value of a capacitive part, and an impedance value of an inductive part in the output impedance value of the direct current combiner box through calculation.

With reference to the first aspect, in a third possible implementation, the direct current combiner box may determine an output impedance value of the direct current combiner box based on an output terminal voltage of the direct current combiner box and a first preset current, and when the output impedance value of the direct current combiner box is greater than a preset output impedance threshold, determine that the direct current combiner box is connected to the inverter, and then control the output voltage of the direct current conversion circuit to be a second preset voltage.

With reference to the first aspect, in a fourth possible implementation, the first preset current is a direct current, an alternating current, or a direct current and an alternating current. Further, when the first preset current is a direct current, the direct current combiner box may obtain an impedance value of a resistive part in the output impedance value of the direct current combiner box through calculation; when the first preset current is an alternating current, obtain an impedance value of a capacitive part and an impedance value of an inductive part in the output impedance value of the direct current combiner box through calculation; or when the first preset current is a direct current and an alternating current, obtain an impedance value of a resistive part, an impedance value of a capacitive part, and an impedance value of an inductive part in the output impedance value of the direct current combiner box through calculation.

With reference to the first aspect, in a fifth possible implementation, when an output terminal voltage of the direct current combiner box meets a preset output voltage range or an output terminal current of the direct current combiner box meets a preset output current range, the direct current combiner box determines an output impedance value of the direct current combiner box based on the output terminal voltage and the output terminal current of the direct current combiner box, and when the output impedance value of the direct current combiner box is greater than a preset output impedance threshold, determines that the direct current combiner box is connected to the inverter, and then controls the output voltage of the direct current conversion circuit in the direct current combiner box to be adjusted to a second preset voltage.

With reference to the first aspect, in a sixth possible implementation, the output terminal voltage of the direct current combiner box includes a direct current voltage and/or an alternating current voltage, and the output terminal current of the direct current combiner box includes a direct current and/or an alternating current. Further, when the output terminal voltage is a direct current voltage and the output terminal current is a direct current, the direct current combiner box may obtain an impedance value of a resistive part in the output impedance value of the direct current combiner box through calculation; when the output terminal voltage is an alternating current voltage and the output terminal current is an alternating current, obtain an impedance value of a capacitive part and an impedance value of an inductive part in the output impedance value of the direct current combiner box through calculation; or when the output terminal voltage is a direct current voltage and an alternating current voltage and the output terminal current is a direct current and an alternating current, obtain an impedance value of a resistive part, an impedance value of a capacitive part, and an impedance value of an inductive part in the output impedance value of the direct current combiner box through calculation.

With reference to the first aspect, in a seventh possible implementation, when an output residual current of the direct current combiner box is greater than a preset residual current threshold, the direct current combiner box may determine that the direct current combiner box is connected to the inverter, and control the output voltage of the direct current conversion circuit to be a second preset voltage.

With reference to the first aspect, in an eighth possible implementation, the direct current combiner box further includes a communication circuit, and the communication circuit is configured to: receive an instruction sent by the inverter, and send the instruction to the controller. When receiving the instruction, the controller controls the output voltage of the direct current conversion circuit to be a third preset voltage, where the third preset voltage is greater than or equal to the second preset voltage, and the third preset voltage is a rated voltage of the direct current conversion circuit. Therefore, after controlling the output voltage of the direct current conversion circuit to be the second preset voltage, the direct current combiner box no longer changes the output voltage of the direct current conversion circuit until receiving the instruction sent by the inverter, and controls the output voltage of the direct current conversion circuit to be adjusted from the second preset voltage to the rated voltage, so that the direct current combiner box completes startup. In addition, when the output voltage of the direct current conversion circuit is the second preset voltage, the direct current combiner box no longer controls the output voltage of the direct current conversion circuit to continue to rise, but continues to control, only when receiving the instruction sent by the inverter, the direct current conversion circuit to complete startup, thereby effectively reducing a loss of the power supply system and reducing a probability of a misoperation of the power supply system.

With reference to the first aspect, in a ninth possible implementation, the direct current conversion circuit includes a power conversion circuit, a voltage regulation circuit, and a breaking switch, and an output voltage of the power conversion circuit is greater than an output voltage of the voltage regulation circuit, where an input terminal of the power conversion circuit is coupled to the input terminal of the direct current conversion circuit through the breaking switch, and an output terminal of the power conversion circuit is coupled to the output terminal of the direct current conversion circuit; and an input terminal of the voltage regulation circuit is coupled to the input terminal of the direct current conversion circuit, and an output terminal of the voltage regulation circuit is coupled to the output terminal of the direct current conversion circuit. The direct current combiner box may control the breaking switch to be turned off, and control the output voltage of the voltage regulation circuit to be the first preset voltage, so that an output voltage of the direct current combiner box is the first preset voltage. Therefore, the direct current conversion circuit can implement a low voltage whose output value is the first preset voltage even if the power conversion circuit does not have a voltage reduction function.

With reference to the first aspect, in a tenth possible implementation, when an output terminal voltage of the direct current combiner box is greater than a preset output voltage threshold, the direct current combiner box may determine that the direct current combiner box is connected to another direct current combiner box, and the another direct current combiner box connected to the direct current combiner box has started. In this case, the direct current combiner box controls the output voltage of the direct current conversion circuit to follow the output terminal voltage of the direct current combiner box for output, to avoid a current surge caused by an excessively high output terminal voltage when the direct current combiner box currently is not started, and ensure that the direct current combiner box currently can start and work normally even if it is difficult to communicate with the inverter and the another connected direct current combiner box.

With reference to the first aspect, in an eleventh possible implementation, when an output terminal current of the direct current combiner box is greater than a preset output current threshold, the direct current combiner box may determine that the direct current combiner box is connected to another direct current combiner box, and the another direct current combiner box connected to the direct current combiner box has started. In this case, the direct current combiner box controls the output voltage of the direct current conversion circuit to follow an output terminal voltage of the direct current combiner box for output, to avoid a current surge caused by an excessively high output terminal voltage when the direct current combiner box currently is not started, and ensure that the direct current combiner box currently can start and work normally even if it is difficult to communicate with the inverter and the another connected direct current combiner box.

With reference to the first aspect, in a twelfth possible implementation, the inverter includes a first inverter and a second inverter, the at least one direct current combiner box includes a first group of direct current combiner boxes and a second group of direct current combiner boxes, and the first group of direct current combiner boxes and the second group of direct current combiner boxes each include at least one direct current combiner box, where output terminals of all direct current combiner boxes in the first group of direct current combiner boxes are connected in parallel, and output terminals of all direct current combiner boxes in the second group of direct current combiner boxes are connected in parallel; first output terminals of all the direct current combiner boxes in the first group of direct current combiner boxes are coupled to form a first node; the first node is connected to a first input terminal of the first inverter through a first wire; second output terminals of all the direct current combiner boxes in the first group of direct current combiner boxes are coupled to first output terminals of all the direct current combiner boxes in the second group of direct current combiner boxes to form a second node; second output terminals of all the direct current combiner boxes in the second group of direct current combiner boxes are coupled to form a third node; the third node is connected to a second input terminal of the second inverter through a second wire; a second input terminal of the first inverter is coupled to a first input terminal of the second inverter to form a fourth node; and the fourth node is connected to the second node through a third wire, where both a through-current capability of the first wire and a through-current capability of the second wire are greater than or equal to a through-current capability of the third wire. The foregoing method for controlling an output voltage of a direct current combiner box is also applied to the power supply system provided in this embodiment. Because output currents of the first group of direct current combiner boxes and output currents of the second group of direct current combiner boxes flow through the third wire at the same time in opposite directions, there is a cancellation phenomenon. Therefore, in a normal working mode, a current value of the third wire is less than or equal to a current value of the first wire or the second wire, and a wire with a lower through-current capability may be selected, thereby saving cables and reducing costs of the power supply system.

With reference to the first aspect, in a thirteenth possible implementation, output voltages of the first group of direct current combiner boxes in a maintenance mode are different from output voltages of the second group of direct current combiner boxes in a maintenance mode, output voltages of all the direct current combiner boxes in the first group of direct current combiner boxes in a maintenance mode are the same, and output voltages of all the direct current combiner boxes in the second group of direct current combiner boxes in a maintenance mode are the same. Therefore, output voltages of different groups of direct current combiner boxes in a maintenance mode are set to be different, so that when a direct current combiner box is being tested, it can be further determined whether the direct current combiner box is connected to a correct group, thereby simplifying a detection manner of the power supply system and reducing maintenance costs of the power supply system.

With reference to the first aspect, in a fourteenth possible implementation, the direct current power supply is a photovoltaic string. Therefore, an application scenario of the power supply system is a photovoltaic scenario.

According to a second aspect, the embodiments may provide a method for controlling an output voltage of a direct current combiner box. The method is applied to a power supply system, the power supply system includes at least one direct current combiner box and an inverter, output terminals of all direct current combiner boxes in the at least one direct current combiner box are connected in series and/or in parallel and then coupled to an input terminal of the inverter, an input terminal of each direct current combiner box is connected to a direct current power supply, and the direct current combiner box includes a controller, a detection circuit, and a direct current conversion circuit, where an input terminal of the direct current conversion circuit is coupled to the input terminal of the direct current combiner box, and an output terminal of the direct current conversion circuit is coupled to the output terminal of the direct current combiner box. The direct current conversion circuit performs direct current conversion on an input terminal voltage of the direct current combiner box to obtain an output terminal voltage of the direct current combiner box. The detection circuit detects an output terminal parameter of the direct current combiner box, and sends the output terminal parameter of the direct current combiner box to the controller. The controller controls an output voltage of the direct current conversion circuit based on the output terminal parameter of the direct current combiner box.

With reference to the second aspect, in a first possible implementation, the controller determines an output impedance value of the direct current combiner box based on an output terminal current of the direct current combiner box and a first preset voltage, and when the output impedance value of the direct current combiner box is greater than a preset output impedance threshold, determines that the direct current combiner box is connected to the inverter, and then controls the output voltage of the direct current conversion circuit to be adjusted from the first preset voltage to a second preset voltage.

With reference to the second aspect, in a second possible implementation, the first preset voltage is a direct current voltage, an alternating current voltage, or a direct current voltage and an alternating current voltage.

With reference to the second aspect, in a third possible implementation, the direct current combiner box may determine an output impedance value of the direct current combiner box based on an output terminal voltage of the direct current combiner box and a first preset current, and when the output impedance value of the direct current combiner box is greater than a preset output impedance threshold, determine that the direct current combiner box is connected to the inverter, and then control the output voltage of the direct current conversion circuit to be a second preset voltage.

With reference to the second aspect, in a fourth possible implementation, the first preset current is a direct current, an alternating current, or a direct current and an alternating current.

With reference to the second aspect, in a fifth possible implementation, when an output terminal voltage of the direct current combiner box meets a preset output voltage range or an output terminal current of the direct current combiner box meets a preset output current range, the direct current combiner box determines an output impedance value of the direct current combiner box based on the output terminal voltage and the output terminal current of the direct current combiner box, and when the output impedance value of the direct current combiner box is greater than a preset output impedance threshold, determines that the direct current combiner box is connected to the inverter, and then controls the output voltage of the direct current conversion circuit in the direct current combiner box to be adjusted to a second preset voltage.

With reference to the second aspect, in a sixth possible implementation, the output terminal voltage of the direct current combiner box includes a direct current voltage and/or an alternating current voltage, and the output terminal current of the direct current combiner box includes a direct current and/or an alternating current.

With reference to the second aspect, in a seventh possible implementation, when an output residual current of the direct current combiner box is greater than a preset residual current threshold, the direct current combiner box may determine that the direct current combiner box is connected to the inverter, and control the output voltage of the direct current conversion circuit to be a second preset voltage.

With reference to the second aspect, in an eighth possible implementation, the direct current combiner box further includes a communication circuit, and the communication circuit is configured to: receive an instruction sent by the inverter, and send the instruction to the controller. When receiving the instruction, the controller controls the output voltage of the direct current conversion circuit to be a third preset voltage, where the third preset voltage is greater than or equal to the second preset voltage, and the third preset voltage is a rated voltage of the direct current conversion circuit.

With reference to the second aspect, in a ninth possible implementation, the direct current conversion circuit includes a power conversion circuit, a voltage regulation circuit, and a breaking switch, and an output voltage of the power conversion circuit is greater than an output voltage of the voltage regulation circuit, where an input terminal of the power conversion circuit is coupled to the input terminal of the direct current conversion circuit through the breaking switch, and an output terminal of the power conversion circuit is coupled to the output terminal of the direct current conversion circuit; and an input terminal of the voltage regulation circuit is coupled to the input terminal of the direct current conversion circuit, and an output terminal of the voltage regulation circuit is coupled to the output terminal of the direct current conversion circuit. The direct current combiner box may control the breaking switch to be turned off, and control the output voltage of the voltage regulation circuit to be the first preset voltage, so that an output voltage of the direct current combiner box is the first preset voltage.

With reference to the second aspect, in a tenth possible implementation, when an output terminal voltage of the direct current combiner box is greater than a preset output voltage threshold, the direct current combiner box determines that the direct current combiner box is connected to another direct current combiner box, and the another direct current combiner box connected to the direct current combiner box has started. In this case, the direct current combiner box controls the output voltage of the direct current conversion circuit to follow the output terminal voltage of the direct current combiner box for output.

With reference to the second aspect, in an eleventh possible implementation, when an output terminal current of the direct current combiner box is greater than a preset output current threshold, the direct current combiner box determines that the direct current combiner box is connected to another direct current combiner box, and the another direct current combiner box connected to the direct current combiner box has started. In this case, the direct current combiner box controls the output voltage of the direct current conversion circuit to follow an output terminal voltage of the direct current combiner box for output.

With reference to the second aspect, in a twelfth possible implementation, the inverter includes a first inverter and a second inverter, the at least one direct current combiner box includes a first group of direct current combiner boxes and a second group of direct current combiner boxes, and the first group of direct current combiner boxes and the second group of direct current combiner boxes each include at least one direct current combiner box, where output terminals of all direct current combiner boxes in the first group of direct current combiner boxes are connected in parallel, and output terminals of all direct current combiner boxes in the second group of direct current combiner boxes are connected in parallel; first output terminals of all the direct current combiner boxes in the first group of direct current combiner boxes are coupled to form a first node; the first node is connected to a first input terminal of the first inverter through a first wire; second output terminals of all the direct current combiner boxes in the first group of direct current combiner boxes are coupled to first output terminals of all the direct current combiner boxes in the second group of direct current combiner boxes to form a second node; second output terminals of all the direct current combiner boxes in the second group of direct current combiner boxes are coupled to form a third node; the third node is connected to a second input terminal of the second inverter through a second wire; a second input terminal of the first inverter is coupled to a first input terminal of the second inverter to form a fourth node; and the fourth node is connected to the second node through a third wire, where both a through-current capability of the first wire and a through-current capability of the second wire are greater than or equal to a through-current capability of the third wire.

With reference to the second aspect, in a thirteenth possible implementation, output voltages of the first group of direct current combiner boxes in a maintenance mode are different from output voltages of the second group of direct current combiner boxes in a maintenance mode, output voltages of all the direct current combiner boxes in the first group of direct current combiner boxes in a maintenance mode are the same, and output voltages of all the direct current combiner boxes in the second group of direct current combiner boxes in a maintenance mode are the same.

With reference to the second aspect, in a fourteenth possible implementation, the direct current power supply is a photovoltaic string.

It should be understood that implementations and beneficial effects of the foregoing aspects may be referred to each other.

DETAILED DESCRIPTION OF THE EMBODIMENTS

Figure 1A:
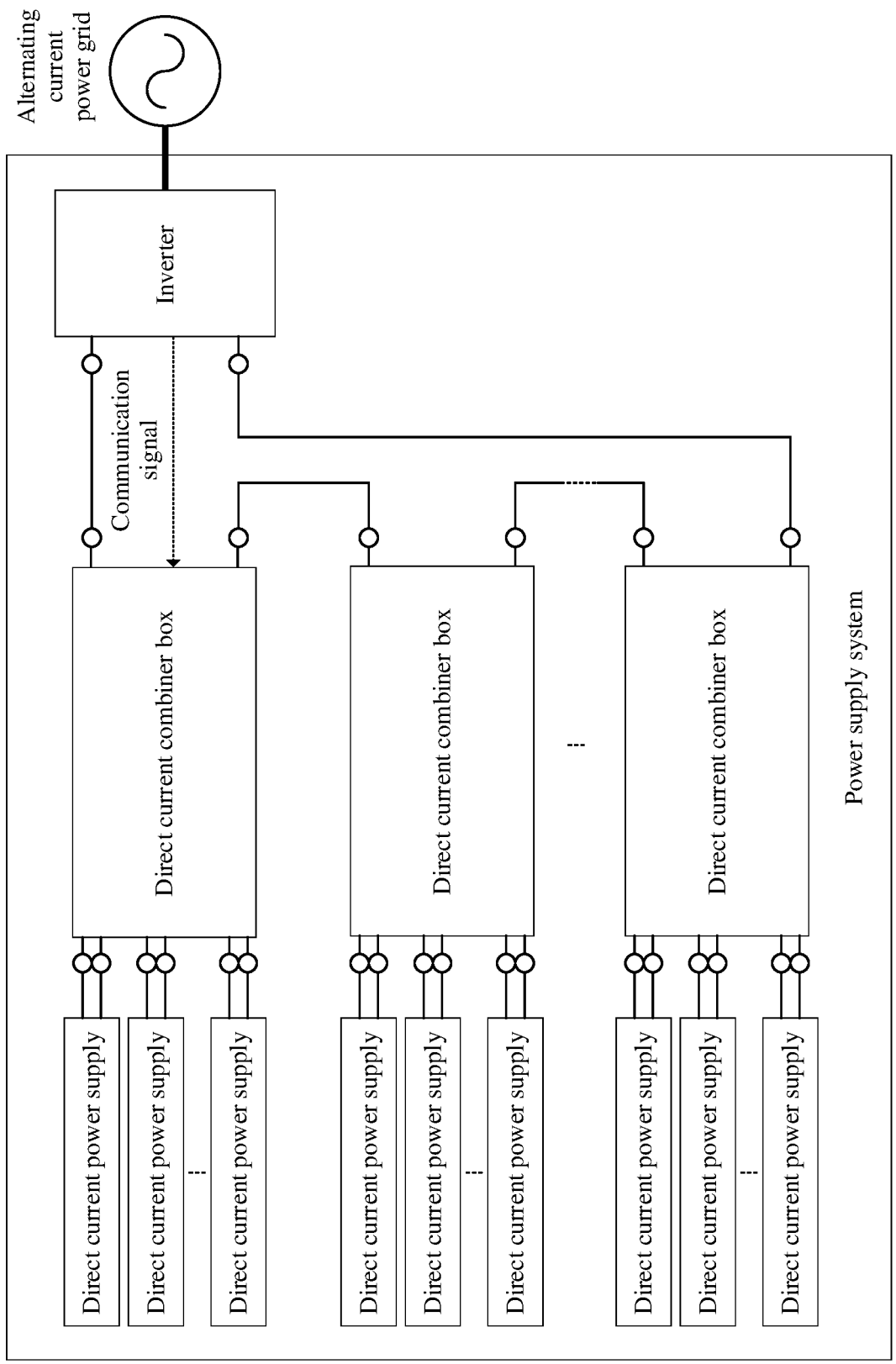
FIG. 1a is a method for controlling an output voltage of a direct current combiner box in the prior art.

A power supply system and a method for controlling an output voltage of a direct current combiner box may be applied to the following scenarios:

In an optional embodiment, the embodiments may be applied to a photovoltaic scenario. In this case, a direct current power supply in the power supply system is a photovoltaic string, and each photovoltaic string may include a plurality of photovoltaic modules connected in series and/or in parallel. The power supply system further includes at least one direct current combiner box and an inverter, where output terminals of the at least one direct current combiner box are connected in series and/or in parallel and then coupled to an input terminal of the inverter, and an input terminal of each direct current combiner box is connected to at least one photovoltaic string, to perform voltage boosting on a direct current generated by the photovoltaic string connected to the direct current combiner box and then output the boosted direct current to the inverter. The inverter is configured to convert, through inversion, the direct current that is generated by the direct current combiner box through voltage boosting into an alternating current that meets a requirement of a power grid. The power supply system may transmit the inverted alternating current to the power grid. In an optional implementation scenario, the power supply system may be further applied to an uninterruptible power supply scenario, that is, an energy storage battery, for example, a nickel-cadmium battery, a nickel-hydrogen battery, a lithium-ion battery, or a lithium polymer battery, may be disposed in the power supply system.

The direct current combiner box includes a detection circuit, a direct current conversion circuit, and a controller. The detection circuit detects an output terminal parameter of the direct current combiner box, and sends the output terminal parameter of the direct current combiner box to the controller. The controller determines a connection relationship between the direct current combiner box and another direct current combiner box in the power supply system or the inverter based on the output terminal parameter of the direct current combiner box, and then may control an output voltage of the direct current conversion circuit based on the connection relationship, to ensure that the direct current combiner box can start and work normally even if it is difficult to communicate with the inverter, thereby improving stability of the power supply system and having high applicability.

In another optional embodiment, the embodiments may alternatively be applied to a multi-machine parallel photovoltaic scenario. In this case, a direct current power supply in the power supply system may be a photovoltaic string or an energy storage cell string, and each energy storage cell string may include a plurality of energy storage batteries connected in series and/or in parallel. The power supply system further includes at least one direct current combiner box and an inverter, where output terminals of the at least one direct current combiner box are connected in series and/or in parallel and then coupled to an input terminal of the inverter, and an input terminal of the direct current combiner box may be connected to at least one photovoltaic string, to perform voltage boosting on a direct current generated by the photovoltaic string connected to the direct current combiner box and then output the boosted direct current to the inverter; or an input terminal of the direct current combiner box may be connected to at least one energy storage cell string, to perform direct current conversion on a direct current generated by the energy storage cell string connected to the direct current combiner box and then output the converted direct current to the inverter. For example, the power supply system includes a first direct current combiner box and a second direct current combiner box in total. The first direct current combiner box is connected to the at least one photovoltaic string, and the second direct current combiner box is connected to the at least one energy storage cell string. The inverter is configured to convert, through inversion, the direct current that is generated by the direct current combiner box through voltage boosting or direct current conversion into an alternating current that meets a requirement of a power grid. The power supply system may transmit the inverted alternating current to the power grid. In an optional implementation scenario, the power supply system may be further applied to an uninterruptible power supply scenario, that is, an energy storage battery, for example, a nickel-cadmium battery, a nickel-hydrogen battery, a lithium-ion battery, or a lithium polymer battery, may be disposed in the power supply system.

The direct current combiner box includes a detection circuit, a direct current conversion circuit, and a controller. The detection circuit detects an output terminal parameter of the direct current combiner box, and sends the output terminal parameter of the direct current combiner box to the controller. The controller determines a connection relationship between the direct current combiner box and another direct current combiner box in the power supply system or the inverter based on the output terminal parameter of the direct current combiner box, and then may control an output voltage of the direct current conversion circuit based on the connection relationship, to ensure that the direct current combiner box can start and work normally even if it is difficult to communicate with the inverter, thereby improving stability of the power supply system and having high applicability.

In still another optional embodiment, the embodiments may alternatively be applied to a battery charging/discharging scenario. In this case, a direct current power supply in the power supply system is an energy storage cell string, and each energy storage cell string may include a plurality of energy storage batteries connected in series and/or in parallel. The power supply system further includes at least one direct current combiner box and an inverter, where output terminals of the at least one direct current combiner box are connected in series and/or in parallel and then coupled to an input terminal of the inverter; and an input terminal of the direct current combiner box is connected to at least one energy storage cell string, to perform direct current conversion on a direct current generated by the energy storage cell string connected to the direct current combiner box and then output the converted direct current to the inverter. The inverter is configured to convert, through inversion, the direct current that is generated by the direct current combiner box through direct current conversion into an alternating current that meets a requirement of a power grid. The power supply system may transmit the inverted alternating current to the power grid.

The direct current combiner box includes a detection circuit, a direct current conversion circuit, and a controller. The detection circuit detects an output terminal parameter of the direct current combiner box, and sends the output terminal parameter of the direct current combiner box to the controller. The controller determines a connection relationship between the direct current combiner box and another direct current combiner box in the power supply system or the inverter based on the output terminal parameter of the direct current combiner box, and then may control an output voltage of the direct current conversion circuit based on the connection relationship, to ensure that the direct current combiner box can start and work normally even if it is difficult to communicate with the inverter, thereby improving stability of the power supply system and having high applicability.

Examples of application scenarios of the power supply system are merely illustrated above but are not exhaustive. The application scenarios are not limited.

Figure 1B:
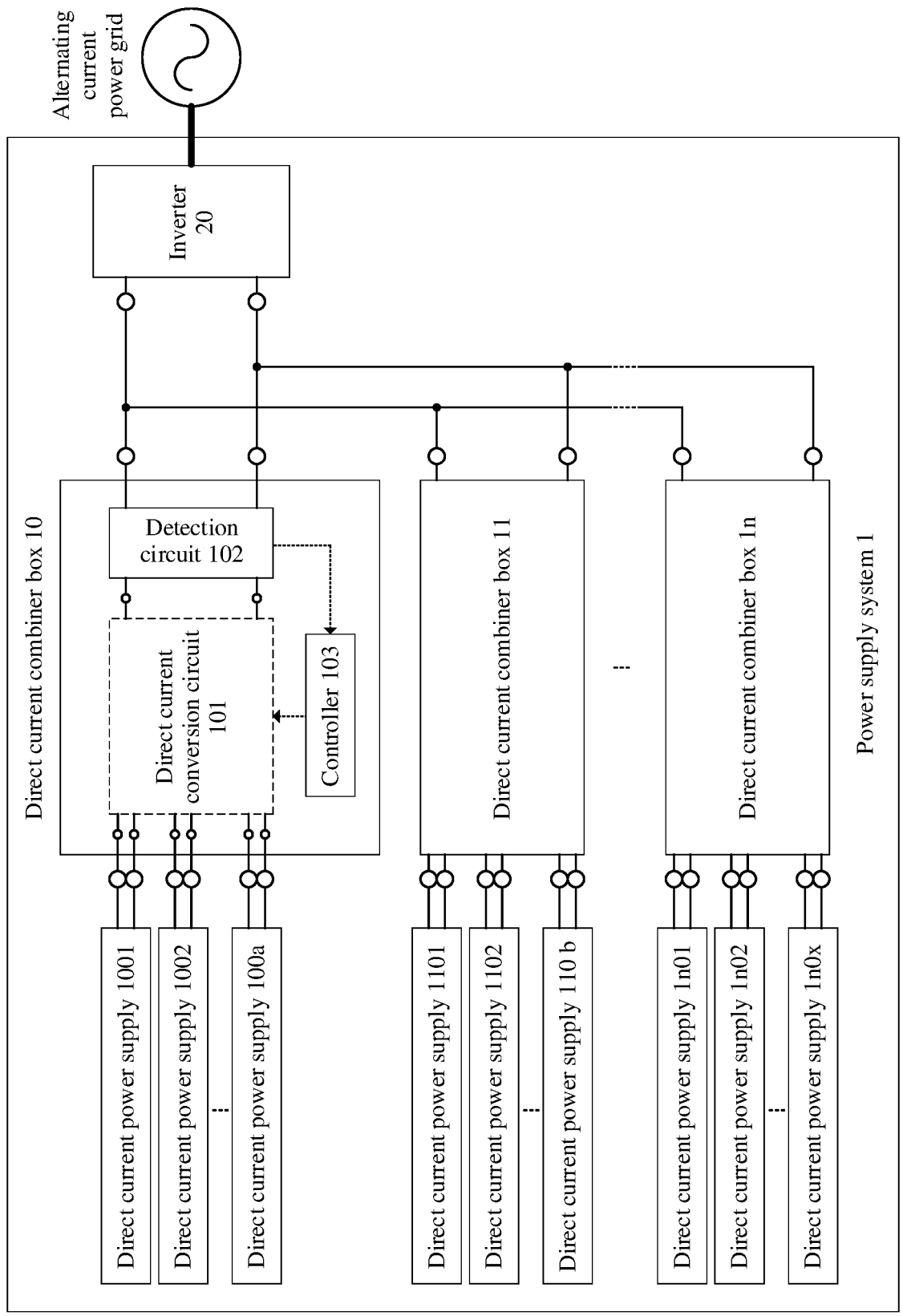
FIG. 1B is a schematic diagram of a structure of a power supply system in which output terminals of direct current combiner boxes are connected in parallel.

FIG. 1B is a schematic diagram of a structure of a power supply system in which output terminals of direct current combiner boxes are connected in parallel. As shown in FIG. 1B, a power supply system 1 includes a direct current combiner box 10, a direct current combiner box 11, . . . , a direct current combiner box 1n, and an inverter 20. An input terminal of the direct current combiner box 10 is connected to a direct current power supply 1001, a direct current power supply 1002, . . . , and a direct current power supply 100a, an input terminal of the direct current combiner box 11 is connected to a direct current power supply 1101, a direct current power supply 1102, . . . , and a direct current power supply 110b, . . . , and an input terminal of the direct current combiner box 1n is connected to a direct current power supply 1n01, a direct current power supply 1n02, . . . , and a direct current power supply 1n0x. Output terminals of the direct current combiner box 10, the direct current combiner box 11, . . . , and the direct current combiner box 1n are connected in parallel and then connected to an input terminal of the inverter 20 through a connection wire, and an output terminal of the inverter 20 is connected to an alternating current power grid.

Because all the direct current combiner boxes in the power supply system 1 have a same structure and a same output voltage control manner, the following uses the direct current combiner box 10 as an example for description. The direct current combiner box 10 includes a direct current conversion circuit 101, a detection circuit 102, and a controller 103. An input terminal of the direct current conversion circuit 101 is coupled to the input terminal of the direct current combiner box 10, and an output terminal of the direct current conversion circuit 101 is coupled to an output terminal of the direct current combiner box 10 through the detection circuit 102.

The controller 103 may determine a connection relationship between the direct current combiner box 10 and another direct current combiner box (corresponding to the direct current combiner box 11, . . . , or the direct current combiner box 1n) in the power supply system 1 or the inverter 20 based on an output terminal parameter of the direct current combiner box 10, and control an output voltage of the direct current conversion circuit 101 based on the connection relationship.

In an optional embodiment, when the input terminal of the direct current combiner box 10 supplies power, the controller 103 starts working, and controls the output voltage of the direct current conversion circuit 101 to be a first preset voltage, where the first preset voltage includes a direct current voltage, an alternating current voltage, or a direct current voltage and an alternating current voltage. The first preset voltage may be less than or equal to a safe voltage of a human body, for example, 36 V.

Figure 2A:
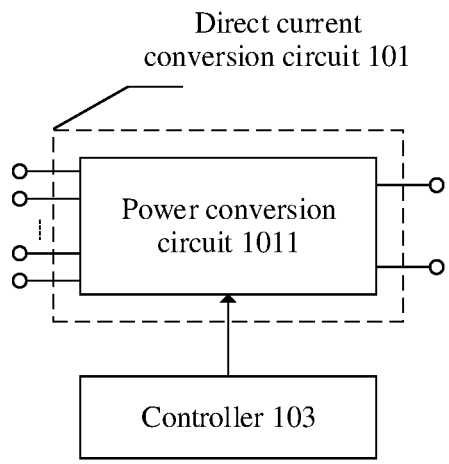
FIG. 2a is a schematic diagram of a structure of a direct current conversion circuit.

In an optional implementation, FIG. 2a is a schematic diagram of a structure of a direct current conversion circuit. As shown in FIG. 2a, the direct current conversion circuit 101 includes a primary power circuit 1011 (for example, a Buck-Boost conversion circuit), and a controllable switching transistor in the primary power circuit 1011 is connected to the controller.

When the first preset voltage is a direct current voltage, the controller 103 may output a corresponding pulse width modulation wave with a fixed duty cycle to the controllable switching transistor in the primary power circuit 1011, so that the output voltage of the direct current conversion circuit 101 is the first preset voltage.

When the first preset voltage is an alternating current voltage, the controller 103 may output a corresponding pulse width modulation wave with a constantly changing duty cycle to the controllable switching transistor in the primary power circuit 1011, and control change frequency of the duty cycle to be lower than switching frequency of the controllable switching transistor, so that the output voltage of the direct current conversion circuit 101 is the first preset voltage.

When the first preset voltage is a direct current voltage and an alternating current voltage, the controller 103 may output a corresponding pulse width modulation wave with a duty cycle that constantly changes around a fixed value to the controllable switching transistor in the primary power circuit 1011, and control change frequency of the duty cycle to be lower than switching frequency of the controllable switching transistor, so that the output voltage of the direct current conversion circuit 101 is the first preset voltage.

Figure 2B:
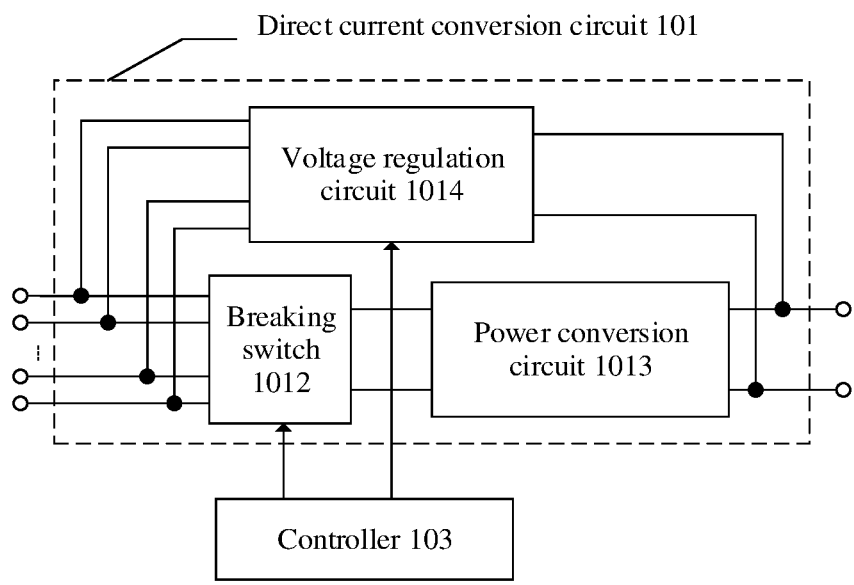
FIG. 2b is another schematic diagram of a structure of a direct current conversion circuit.

In another optional implementation, FIG. 2b is another schematic diagram of a structure of a direct current conversion circuit. As shown in FIG. 2b, the direct current conversion circuit 101 includes a breaking switch 1012, a power conversion circuit 1013, and a voltage regulation circuit 1014. The power conversion circuit 1013 does not have a voltage reduction function, and an output voltage of the power conversion circuit 1013 is greater than an output voltage of the voltage regulation circuit 1014. An input terminal of the power conversion circuit 1013 is coupled to the input terminal of the direct current conversion circuit 101 through the breaking switch 1012, and an output terminal of the power conversion circuit 1013 is coupled to the output terminal of the direct current conversion circuit 101. An input terminal of the voltage regulation circuit 1014 is coupled to the input terminal of the direct current conversion circuit 101, and an output terminal of the voltage regulation circuit 1014 is coupled to the output terminal of the direct current conversion circuit 101. The power conversion circuit 1013 (for example, a Boost conversion circuit) cannot output a relatively low voltage, and when an input voltage of the direct current conversion circuit 101 is relatively high, the output voltage of the power conversion circuit 1013 may follow the input voltage of the direct current conversion circuit 101 to reach a relatively large value. Therefore, the breaking switch 1012 needs to be added between the input terminal of the direct current conversion circuit 101 and the input terminal of the power conversion circuit 1013 to be turned off, and the voltage regulation circuit 1014 coupled between the input terminal and the output terminal of the direct current conversion circuit 101 is added. The controller 103 controls the breaking switch 1012 to be turned off, and therefore the power conversion circuit 1013 does not work. In addition, the controller 103 controls the output voltage of the voltage regulation circuit 1014 to be the first preset voltage, so that the output voltage of the direct current conversion circuit 101 is the first preset voltage. The voltage regulation circuit 1014 may be an additional circuit, or may be shared with a pre-charging circuit, a soft start circuit, a potential induced degradation circuit, and the like in the direct current conversion circuit 101. Herein, for an implementation in which the controller 103 controls, to be a direct current voltage, an alternating current voltage, or a direct current voltage and an alternating current voltage, the first preset voltage output by the direct current conversion circuit 101, refer to the implementation in which the controller 103 controls, to be a direct current voltage, an alternating current voltage, or a direct current voltage and an alternating current voltage, the first preset voltage output by the direct current conversion circuit 101 in the embodiment shown in FIG. 2a. Details are not described herein again.

Then, when the output voltage of the direct current conversion circuit 101 is the first preset voltage, the controller 103 sends an output current sampling signal to the detection circuit 102. The detection circuit 102 collects an output terminal current of the direct current combiner box 10 based on the output current sampling signal, and returns the output terminal current of the direct current combiner box 10 to the controller 103. The controller 103 determines a ratio of the first preset voltage to the output terminal current of the direct current combiner box 10 as an output impedance value of the direct current combiner box 10, compares the output impedance value of the direct current combiner box 10 with a preset output impedance threshold, and when the output impedance value of the direct current combiner box 10 is greater than the preset output impedance threshold, determines that the direct current combiner box 10 is connected to the inverter 20, and controls the output voltage of the direct current conversion circuit 101 to be adjusted from the first preset voltage to a second preset voltage, where the second preset voltage is greater than the first preset voltage. Herein, for an implementation in which the controller 103 controls the output voltage of the direct current conversion circuit 101 to be the second preset voltage, refer to the implementation in which the controller 103 controls the output voltage of the direct current conversion circuit 101 to be the first preset voltage in this embodiment. Details are not described herein again.

In another optional embodiment, when the input terminal of the direct current combiner box 10 supplies power, the controller 103 starts working, and controls an output current of the direct current conversion circuit 101 to be a first preset current, where the first preset current includes a direct current, an alternating current, or a direct current and an alternating current. The first preset current may be less than or equal to a safe current of a human body, or when the output current of the direct current conversion circuit 101 is the first preset current, the input voltage of the direct current conversion circuit 101 is less than or equal to a safe voltage of a human body. Herein, for an implementation in which the controller 103 controls the output current of the direct current conversion circuit 101 to be the first preset current, refer to the implementation in which the controller 103 controls the output voltage of the direct current conversion circuit 101 to be the first preset voltage in the foregoing embodiment. Details are not described herein again.

Then, when the output current of the direct current conversion circuit 101 is the first preset current, the controller 103 sends an output voltage sampling signal to the detection circuit 102. The detection circuit 102 collects an output terminal voltage of the direct current combiner box 10 based on the output voltage sampling signal, and returns the output terminal voltage of the direct current combiner box 10 to the controller 103. The controller 103 determines a ratio of the output terminal voltage of the direct current combiner box 10 to the first preset current as an output impedance value of the direct current combiner box 10, compares the output impedance value of the direct current combiner box 10 with a preset output impedance threshold, and when the output impedance value of the direct current combiner box 10 is greater than the preset output impedance threshold, determines that the direct current combiner box 10 is connected to the inverter 20, and controls the output voltage of the direct current conversion circuit 101 to be a second preset voltage. Herein, for an implementation in which the controller 103 controls the output voltage of the direct current conversion circuit 101 to be the second preset voltage, refer to the implementation in which the controller 103 controls the output voltage of the direct current conversion circuit 101 to be the first preset voltage in this embodiment. Details are not described herein again.

It should be noted that, the controller 103 may further determine a connection relationship between the direct current combiner box 10 and the direct current combiner box 11, ..., and the direct current combiner box 1n by changing the preset output impedance threshold. In addition, to enable the inverter 20 to obtain adequate electric energy and start normally, when determining that the direct current combiner box 10 is connected to the inverter 20 and a quantity of other direct current combiner boxes connected to the direct current combiner box 10 is greater than a preset quantity threshold, the controller 103 generally controls the output voltage of the direct current conversion circuit 101 to be the second preset voltage.

Further, the controller 103 may control the direct current conversion circuit 101 to output the first preset voltage that is a direct current voltage and an alternating current voltage, and the detection circuit 102 detects the output terminal current of the direct current combiner box 10 when the output voltage of the direct current conversion circuit 101 is the first preset voltage, to effectively detect a resistive impedance value, a capacitive impedance value, and an inductive impedance value at the output terminal of the direct current combiner box 10. Alternatively, the controller 103 may control the direct current conversion circuit 101 to output the first preset current that is a direct current and an alternating current, and the detection circuit 102 detects the output terminal voltage of the direct current combiner box 10 when the output current of the direct current conversion circuit 101 is the first preset current, to effectively detect a resistive impedance value, a capacitive impedance value, and an inductive impedance value at the output terminal of the direct current combiner box 10. When an output impedance value of a single direct current combiner box and an input impedance value of the inverter 20 are known, the controller 103 may determine, based on the calculated output impedance value of the direct current combiner box 10, whether the output terminal of the direct current combiner box 10 is connected to another direct current combiner box and the inverter 20, and may further determine a connection relationship between each direct current combiner box in the power supply system 1 in which the direct current combiner box 10 is located and each inverter 20.

For example, it is assumed that an output impedance of each direct current combiner box is in resistance-capacitance parallel, a resistance value is 1 MΩ, and a capacitance value is 100 µF; and an input impedance of an inverter is in inductance-capacitance series, an inductance value is 100 µH, and a capacitance value is 500 µF. The output impedance value of the direct current combiner box calculated by the controller is a 0.2 MΩ resistor connected in parallel to a 500 µF capacitor, and then a 100 µH inductor connected in series to a 500 µF capacitor. The controller may determine that the output terminal of the direct current combiner box is connected to four other direct current combiner boxes and the inverter. In addition, there is a parallel relationship between the direct current combiner boxes, and output terminals of the direct current combiner boxes are connected in parallel and connected to the input terminal of the inverter in parallel.

In this embodiment, the controller 103 may determine a connection relationship between the direct current combiner box 10 and the direct current combiner box 11, . . . , the direct current combiner box 1n, and the inverter 20 based on the calculated output impedance value of the direct current combiner box 10, and control the output voltage of the direct current conversion circuit 101 based on the connection relationship, to ensure that the direct current combiner box 10 can start and work normally even if it is difficult to communicate with the inverter 20, thereby improving stability of the power supply system 1 and having high applicability.

Based on the power supply system 1 shown in FIG. 1B, the embodiments may further provide a method for controlling an output voltage of a direct current combiner box, including:

The controller 103 controls the output voltage of the direct current conversion circuit 101 to be a first preset voltage, determines an output impedance value of the direct current combiner box based on an output terminal current of the direct current combiner box 10 and the first preset voltage, and when the output impedance value of the direct current combiner box 10 is greater than a preset output impedance threshold, controls the output voltage of the direct current conversion circuit 101 to be a second preset voltage, where the output terminal current of the direct current combiner box 10 is detected by the detection circuit 102 when the output voltage of the direct current conversion circuit 101 is the first preset voltage.

Alternatively, the controller 103 controls an output current of the direct current conversion circuit 101 to be a first preset current, determines an output impedance value of the direct current combiner box 10 based on an output terminal voltage of the direct current combiner box 10 and the first preset current, and when the output impedance value of the direct current combiner box 10 is greater than a preset output impedance threshold, controls the output voltage of the direct current conversion circuit 101 to be a second preset voltage, where the output terminal voltage of the direct current combiner box 10 is detected by the detection circuit 102 when the output current of the direct current conversion circuit 101 is the first preset current.

In another optional embodiment, when the input terminal of the direct current combiner box 10 supplies power, an input voltage or an input current of the direct current combiner box 10 is not 0, and the controller 103 starts working, and sends an output voltage and current sampling signal to the detection circuit 102. The detection circuit 102 collects an output terminal voltage and an output terminal current of the direct current combiner box 10 based on the output voltage and current sampling signal, and returns the output terminal voltage and the output terminal current of the direct current combiner box 10 to the controller 103.

The controller 103 determines whether the output terminal voltage of the direct current combiner box 10 meets a preset output voltage range (that is, greater than 0 and less than or equal to a first preset voltage). When the output terminal voltage of the direct current combiner box 10 meets the preset output voltage range, it indicates that the direct current combiner box 10 is connected to another direct current combiner box in the power supply system 1, and the another direct current combiner box connected to the direct current combiner box 10 has started to output the first preset voltage, and therefore the direct current combiner box 10 does not need to output the first preset voltage. In this case, the controller 103 determines a ratio of the output terminal voltage of the direct current combiner box 10 to the output terminal current of the direct current combiner box 10 as an output impedance value of the direct current combiner box 10, and when the output impedance value of the direct current combiner box 10 is greater than a preset output impedance threshold, controls the output voltage of the direct current conversion circuit 101 to be adjusted to a second preset voltage.

Optionally, the controller 103 determines whether the output terminal current of the direct current combiner box 10 meets a preset output current range (that is, greater than 0 and less than or equal to a first preset current). When the output terminal current of the direct current combiner box meets the preset output current range, it indicates that the direct current combiner box 10 is connected to another direct current combiner box in the power supply system 1, and the another direct current combiner box connected to the direct current combiner box 10 has started to output the first preset current, and therefore the direct current combiner box 10 does not need to output the first preset current. In this case, the controller 103 determines a ratio of the output terminal voltage of the direct current combiner box 10 to the output terminal current of the direct current combiner box 10 as an output impedance value of the direct current combiner box 10, and when the output impedance value of the direct current combiner box 10 is greater than a preset output impedance threshold, controls the output voltage of the direct current conversion circuit 101 to be adjusted to a second preset voltage.

In this embodiment, the controller 103 does not need to output the first preset voltage when the output terminal voltage of the direct current combiner box 10 meets the preset output voltage range or does not need to output the first preset current when the output terminal current of the direct current combiner box 10 meets the preset output current range. Then, the controller 103 may determine a connection relationship between the direct current combiner box 10 and the direct current combiner box 11, . . . , the direct current combiner box 1n, and the inverter 20 based on the output terminal voltage and the output terminal current of the direct current combiner box 10, and control the output voltage of the direct current conversion circuit 101 based on the connection relationship, to cope with a case in which another direct current combiner box has started to output a voltage or a current. This avoids a conflict with the voltage or the current output by the another direct current combiner box if the direct current combiner box 10 outputs a voltage or a current again, to ensure that the direct current combiner box 10 can start and work normally even if it is difficult to communicate with the inverter 20 and the another connected direct current combiner box, thereby improving stability of the power supply system 1 and having high applicability.

Based on the power supply system 1 shown in FIG. 1B, the embodiments may further provide a method for controlling an output voltage of a direct current combiner box, including:

When an output terminal voltage of the direct current combiner box 10 meets a preset output voltage range or an output terminal current of the direct current combiner box 10 meets a preset output current range, an output impedance value of the direct current combiner box 10 is determined based on the output terminal voltage and the output terminal current of the direct current combiner box 10, and when the output impedance value of the direct current combiner box 10 is greater than a preset output impedance threshold, the output voltage of the direct current conversion circuit 101 is controlled to be a second preset voltage, where the output terminal voltage and the output terminal current of the direct current combiner box 10 are detected by the detection circuit 102 when an input parameter of the direct current combiner box 10 is not a preset input parameter value.

In another optional embodiment, when the input terminal of the direct current combiner box 10 supplies power, an input voltage or an input current of the direct current combiner box 10 is not 0, and the controller 103 starts working, and sends an output residual current sampling signal to the detection circuit 102. The detection circuit 102 collects an output residual current of the direct current combiner box 10 based on the output residual current sampling signal, and returns the output residual current of the direct current combiner box 10 to the controller 103. The controller 103 compares the output residual current of the direct current combiner box 10 with a preset residual current threshold, and when the output residual current of the direct current combiner box 10 is greater than the preset residual current threshold (for example, 100 mA), determines that the direct current combiner box 10 is connected to the inverter 20, and controls the output voltage of the direct current conversion circuit 101 to be a second preset voltage. For example, the detection circuit 102 is a residual current device (RCD).

In this embodiment, the controller 103 may determine a connection relationship between the direct current combiner box 10 and the inverter 20 based on the output residual current of the direct current combiner box 10, and control the output voltage of the direct current conversion circuit 101 based on the connection relationship, to ensure that the direct current combiner box 10 can start and work normally even if it is difficult to communicate with the inverter 20, thereby improving stability of the power supply system 1 and having high applicability.

Based on the power supply system 1 shown in FIG. 1B, the embodiments may further provide a method for controlling an output voltage of a direct current combiner box, including:

When an output residual current of the direct current combiner box 10 is greater than a preset residual current threshold, the controller 103 controls the output voltage of the direct current conversion circuit 101 to be a second preset voltage, where the output residual current of the direct current combiner box 10 is detected by the detection circuit 102 when an input parameter of the direct current combiner box 10 is not a preset input parameter value.

In still another optional embodiment, when the input terminal of the direct current combiner box 10 supplies power, an input voltage or an input current of the direct current combiner box 10 is not 0, and the controller 103 starts working, and sends an output voltage sampling signal to the detection circuit 102. The detection circuit 102 collects an output terminal voltage of the direct current combiner box 10 based on the output voltage sampling signal, and returns the output terminal voltage of the direct current combiner box 10 to the controller 103.

The controller 103 determines whether the output terminal voltage of the direct current combiner box 10 is greater than a preset output voltage threshold, where the preset output voltage threshold is greater than a first preset voltage. When the output terminal voltage of the direct current combiner box 10 is greater than the preset output voltage threshold, it indicates that the direct current combiner box 10 is connected to another direct current combiner box in the power supply system 1, and the another direct current combiner box connected to the direct current combiner box 10 has started. In this case, the controller 103 controls the output voltage of the direct current conversion circuit 101 to be adjusted to the output terminal voltage of the direct current combiner box 10, that is, controls the output voltage of the direct current conversion circuit 101 to follow the output terminal voltage of the direct current combiner box 10.

In this embodiment, when the output terminal voltage of the direct current combiner box 10 is greater than the preset output voltage threshold, the controller 103 may determine that the another direct current combiner box connected to the direct current combiner box 10 has started, and control the output voltage of the direct current conversion circuit 101 to follow the output terminal voltage of the direct current combiner box 10, to avoid a current surge caused by an excessively high output terminal voltage when the direct current combiner box 10 is not started, and ensure that the direct current combiner box 10 can start and work normally even if it is difficult to communicate with the inverter 20 and the another connected direct current combiner box, thereby improving stability of the power supply system 1 and having high applicability.

Based on the power supply system 1 shown in FIG. 1B, the embodiments may further provide a method for controlling an output voltage of a direct current combiner box, including:

An output terminal parameter of the direct current combiner box 10 includes an output terminal voltage of the direct current combiner box 10.

When the output terminal voltage of the direct current combiner box 10 is greater than a preset output voltage threshold, the controller 103 controls the output voltage of the direct current conversion circuit 101 to be the output terminal voltage of the direct current combiner box 10, where the output terminal voltage of the direct current combiner box 10 is detected by the detection circuit 102 when an input parameter of the direct current combiner box 10 is not a preset input parameter value.

Figure 3:
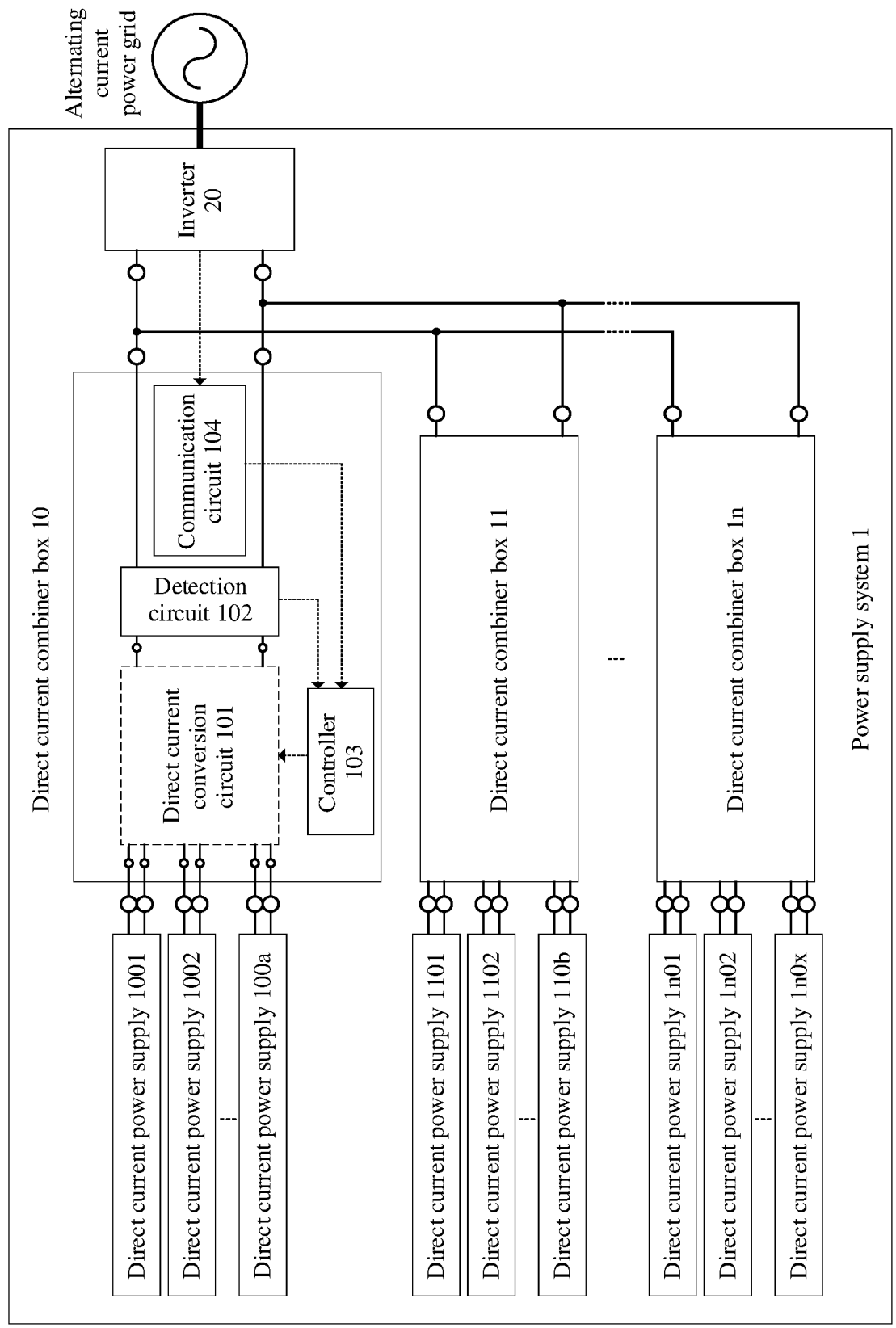
FIG. 3 is another schematic diagram of a structure of a power supply system in which output terminals of direct current combiner boxes are connected in parallel.

Further, each direct current combiner box in the power supply system 1 shown in FIG. 1B may further include a communication circuit. For details, refer to another schematic diagram of a structure of a power supply system shown in FIG. 3. As shown in FIG. 3, the direct current combiner box 10 further includes a communication circuit 104, configured to: receive an instruction sent by the inverter 20, and send the instruction to the controller 103. A communication manner between the communication circuit 104 and the inverter 20 may be power cable communication, dedicated wired communication, or wireless communication.

In an optional embodiment, when the input terminal of the direct current combiner box 10 supplies power, the controller 103 starts working, controls the output voltage of the direct current conversion circuit 101 to be a first preset voltage, and sends an output current sampling signal to the detection circuit 102 when the output voltage of the direct current conversion circuit 101 is the first preset voltage. The detection circuit 102 collects an output terminal current of the direct current combiner box 10 based on the output current sampling signal, and sends the output terminal current of the direct current combiner box 10 to the controller 103. The controller 103 determines an output impedance value of the direct current combiner box 10 based on the output terminal current of the direct current combiner box 10 and the first preset voltage, and when the output impedance value of the direct current combiner box 10 is greater than a preset output impedance threshold, controls the output voltage of the direct current conversion circuit 101 to rise from the first preset voltage to a second preset voltage.

Optionally, when the input terminal of the direct current combiner box 10 supplies power, the controller 103 starts working, controls an output current of the direct current conversion circuit 101 to be a first preset current, and sends an output voltage sampling signal to the detection circuit 102 when the output current of the direct current conversion circuit 101 is the first preset current. The detection circuit 102 collects an output terminal voltage of the direct current combiner box 10 based on the output voltage sampling signal, and sends the output terminal voltage of the direct current combiner box 10 to the controller 103. The controller 103 determines an output impedance value of the direct current combiner box 10 based on the output terminal voltage of the direct current combiner box 10 and the first preset current, and when the output impedance value of the direct current combiner box 10 is greater than a preset output impedance threshold, controls the output voltage of the direct current conversion circuit 101 to be adjusted from a first preset voltage to a second preset voltage.

Optionally, when the input terminal of the direct current combiner box 10 supplies power, an input voltage or an input current of the direct current combiner box 10 is not 0, and the controller 103 starts working, and sends an output voltage and current sampling signal to the detection circuit 102. The detection circuit 102 collects an output terminal voltage and an output terminal current of the direct current combiner box 10 based on the output voltage and current sampling signal, and returns the output terminal voltage and the output terminal current of the direct current combiner box to the controller 103. When the output terminal voltage of the direct current combiner box 10 meets a preset output voltage range or the output terminal current of the direct current combiner box 10 meets a preset output current range, the controller 103 determines an output impedance value of the direct current combiner box 10 based on the output terminal voltage and the output terminal current of the direct current combiner box 10, and when the output impedance value of the direct current combiner box 10 is greater than a preset output impedance threshold, controls the output voltage of the direct current conversion circuit 101 to be a second preset voltage.

Optionally, when the input terminal of the direct current combiner box 10 supplies power, an input voltage or an input current of the direct current combiner box 10 is not 0, and the controller 103 starts working, and sends an output residual current sampling signal to the detection circuit 102. The detection circuit 102 collects an output residual current of the direct current combiner box 10 based on the output residual current sampling signal, and sends the output residual current of the direct current combiner box 10 to the controller 103. When the output residual current of the direct current combiner box 10 is greater than a preset output residual current threshold, the controller 103 controls the output voltage of the direct current conversion circuit 101 to be a second preset voltage.

When the direct current conversion circuit 101 outputs the second preset voltage, the input terminal of the inverter 20 obtains a voltage equal to the second preset voltage, and the voltage is set to a value that can enable an auxiliary power supply, a control unit, and a communication unit of the inverter 20 to start working. Then, the inverter 20 sends an instruction to the communication circuit 104 of the direct current combiner box 10, and the communication circuit 104 sends the instruction to the controller 103. After receiving the instruction, the controller 103 controls the output voltage of the direct current conversion circuit 101 to be adjusted from the second preset voltage to a third preset voltage, so that the direct current combiner box 10 completes startup. The third preset voltage is generally a rated voltage of the direct current conversion circuit 101, and is greater than or equal to the second preset voltage.

In this embodiment, the controller 103 may determine a connection relationship between the direct current combiner box 10 and the inverter 20 based on the output impedance value or the output residual current of the direct current combiner box 10, and control, based on the connection relationship, the direct current conversion circuit 101 to output the second preset voltage, to ensure that the direct current combiner box 10 can start normally even if it is difficult to communicate with the inverter 20, thereby improving stability of the power supply system 1 and having high applicability. In addition, when the output voltage of the direct current conversion circuit 101 is the second preset voltage, the controller 103 no longer controls the output voltage of the direct current conversion circuit 101 to continue to rise, but continues to control, only when receiving the instruction sent by the inverter 20, the direct current conversion circuit 101 to complete startup, thereby effectively reducing a loss of the power supply system 1 and reducing a probability of a misoperation of the power supply system 1.

Based on the power supply system 1 shown in FIG. 1B, the embodiments may further provide a method for controlling an output voltage of a direct current combiner box, including:

The direct current combiner box 10 further includes a communication circuit 104, and the communication circuit 104 is configured to: receive an instruction sent by the inverter 20, and send the instruction to the controller 103.

When determining that the direct current combiner box 10 is connected to the inverter 20, the controller 103 controls the output voltage of the direct current conversion circuit 101 to be a second preset voltage, and when receiving the instruction, controls the output voltage of the direct current conversion circuit 101 to be adjusted from the second preset voltage to a third preset voltage, where the third preset voltage is greater than or equal to the second preset voltage, and the third preset voltage is a rated voltage of the direct current conversion circuit 101.

In another optional embodiment, when the input terminal of the direct current combiner box 10 supplies power, the controller 103 starts working. When the controller 103 receives, through the communication circuit 104, the instruction sent by the inverter 20, the controller 103 controls the output voltage of the direct current conversion circuit 101 to be a third preset voltage, where the third preset voltage is a rated voltage of the direct current conversion circuit 101.

In this embodiment, the inverter 20 has been supplied with a voltage by another direct current combiner box or in an additional manner such as a power grid and sends the instruction to the communication circuit 104 of the direct current combiner box 10. Therefore, after receiving the instruction, the controller 103 may directly control the output voltage of the direct current conversion circuit 101 to be the third preset voltage, so that the direct current combiner box 10 completes startup.

Figure 4:
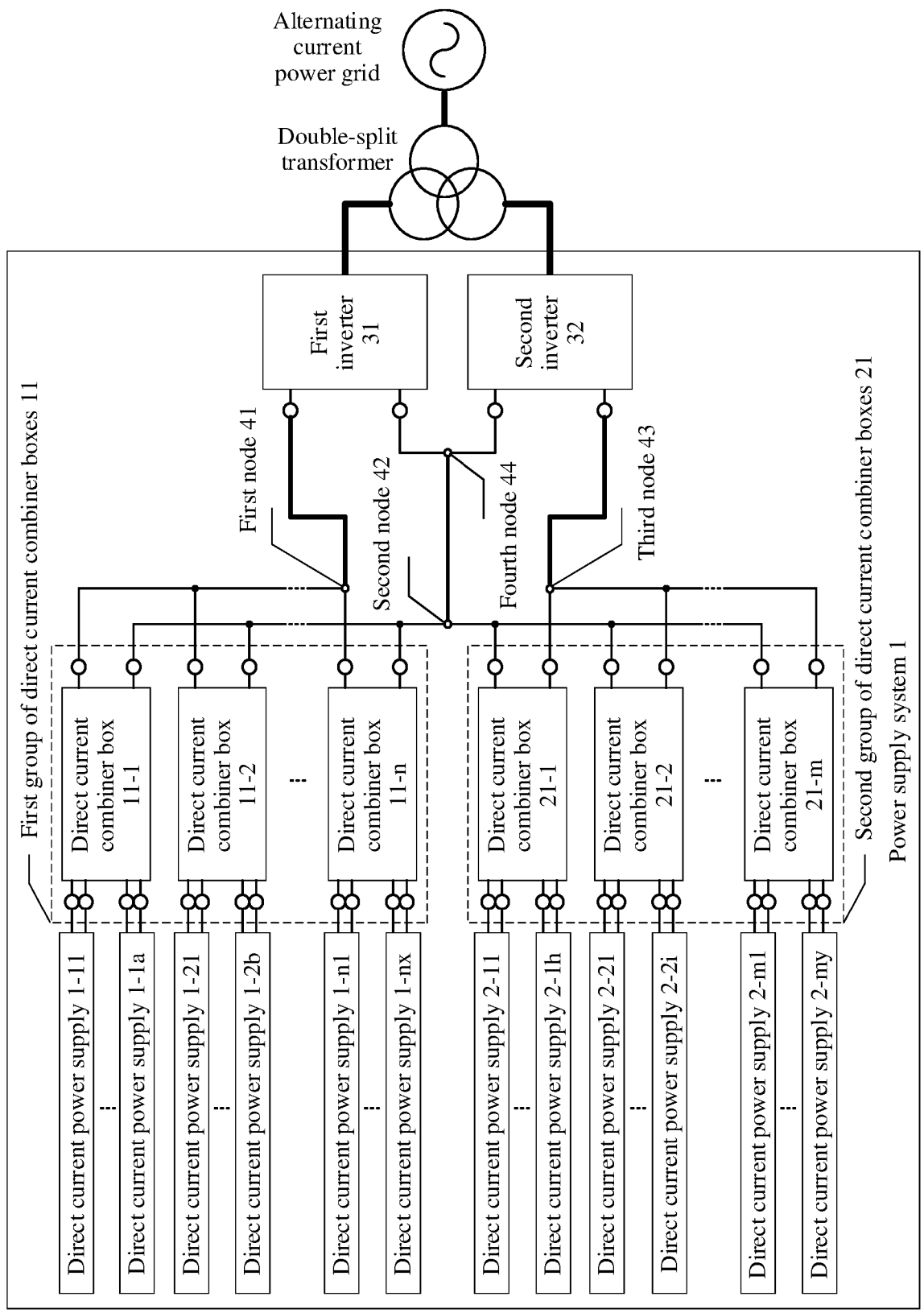
FIG. 4 is still another schematic diagram of a structure of a power supply system in which output terminals of direct current combiner boxes are connected in parallel.

FIG. 4 is still another schematic diagram of a structure of a power supply system in which output terminals of direct current combiner boxes are connected in parallel. As shown in FIG. 4, a power supply system 1 includes a first group of direct current combiner boxes 11, a second group of direct current combiner boxes 21, a first inverter 30, and a second inverter 32. The first group of direct current combiner boxes 11 include a direct current combiner box 11-1, a direct current combiner box 11-2, . . . , and a direct current combiner box 11-n, and the second group of direct current combiner boxes 21 include a direct current combiner box 21-1, a direct current combiner box 21-2, . . . , and a direct current combiner box 21-m.

Output terminals of the direct current combiner box 11-1, the direct current combiner box 11-2, . . . , and the direct current combiner box 11-n are connected in parallel. Positive output terminals of the direct current combiner box 11-1, the direct current combiner box 11-2, . . . , and the direct current combiner box 11-n are coupled to form a first node 41, and the first node 41 is connected to a positive input terminal of the first inverter 31 through a first wire. Negative output terminals of the direct current combiner box 11-1, the direct current combiner box 11-2, . . . , and the direct current combiner box 11-n are coupled to form a second node 42.

Output terminals of the direct current combiner box 21-1, the direct current combiner box 21-2, . . . , and the direct current combiner box 21-m are connected in parallel. Negative output terminals of the direct current combiner box 21-1, the direct current combiner box 21-2, . . . , and the direct current combiner box 21-m are coupled to form a third node 43, and the third node 43 is connected to a negative input terminal of the second inverter 32 through a second wire.

A negative input terminal of the first inverter 31 is coupled to a positive input terminal of the second inverter 32 to form a fourth node 44, and the fourth node 44 is connected to the second node 42 through a third wire. Both a through-current capability of the first wire and a through-current capability of the second wire are greater than or equal to a through-current capability of the third wire.

Because output currents of the first group of direct current combiner boxes and output currents of the second group of direct current combiner boxes flow through the third wire at the same time in opposite directions, there is a cancellation phenomenon. Therefore, in a normal working mode, a current value of the third wire is less than or equal to a current value of the first wire or the second wire, and a wire with a lower through-current capability may be selected, thereby saving cables and reducing costs of the power supply system.

When output terminals of direct current combiner boxes are connected in parallel and then the direct current combiner boxes are classified into a plurality of groups, output voltages (that is, first preset voltages) of different groups of direct current combiner boxes in a maintenance mode may be the same or may be different, and output currents (that is, first preset currents) of different groups of direct current combiner boxes in a maintenance mode may be the same or may be different.

In this embodiment, for a structure of each direct current combiner box in the power supply system 1 and an implementation of controlling an output voltage of each direct current combiner box, refer to the structure of the direct current combiner box and the implementation of controlling an output voltage of each direct current combiner box in the embodiments shown in FIG. 1B and FIG. 3. Details are not described herein again.

It may be understood that in this embodiment, an output voltage of a direct current combiner box may be controlled based on an output terminal parameter of the direct current combiner box, to ensure that the direct current combiner box can start and work normally even if it is difficult to communicate with the inverter, thereby improving stability of the power supply system 1 and having high applicability. In addition, output voltages of different groups of direct current combiner boxes in a maintenance mode are set to be different, so that when a direct current combiner box is being tested, it can be further determined whether the direct current combiner box is connected to a correct group, thereby simplifying a detection manner of the power supply system 1 and reducing maintenance costs of the power supply system 1.

Figure 5:
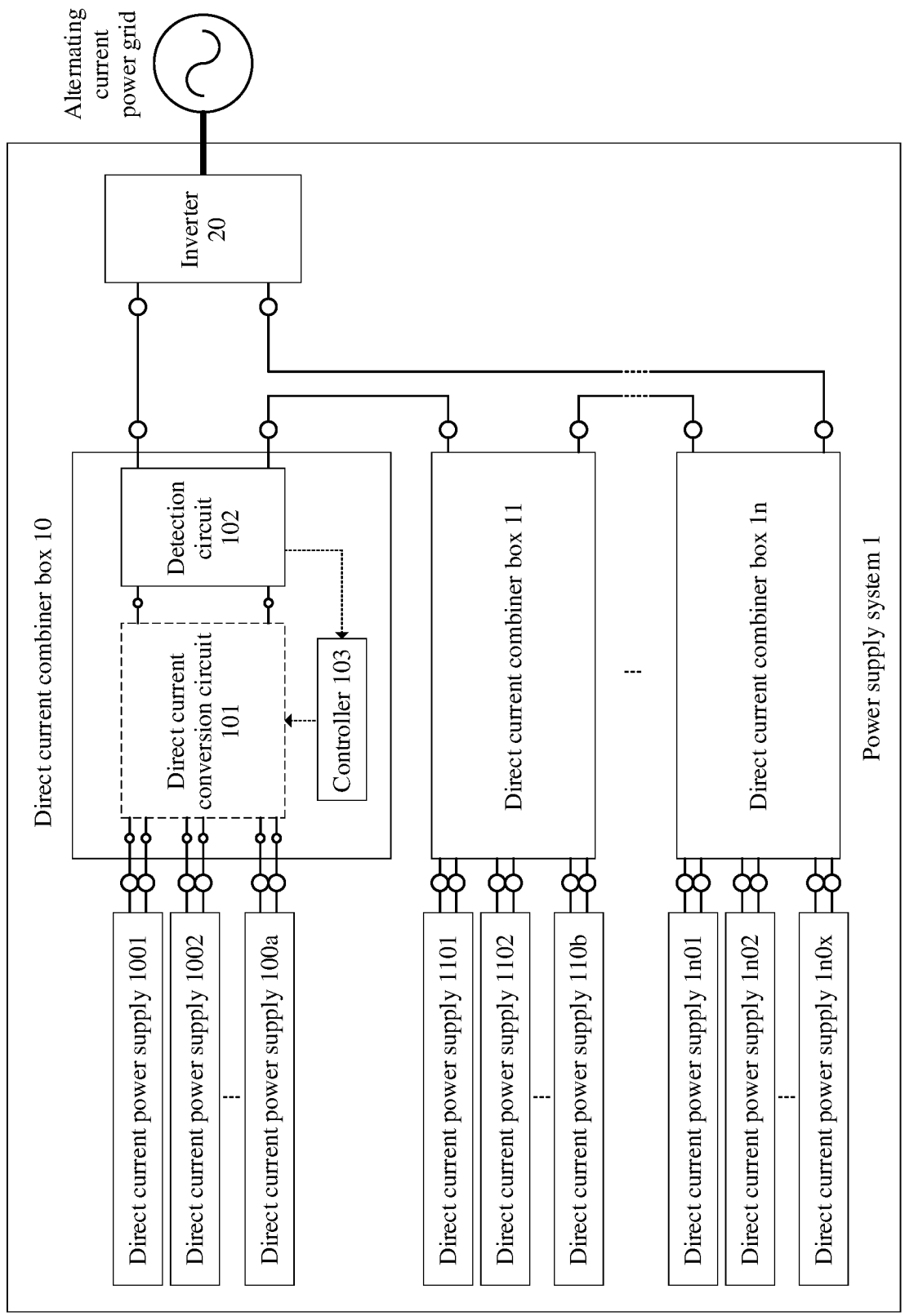
FIG. 5 is a schematic diagram of a structure of a power supply system in which output terminals of direct current combiner boxes are connected in series.

FIG. 5 is a schematic diagram of a structure of a power supply system in which output terminals of direct current combiner boxes are connected in series. As shown in FIG. 5, a power supply system 1 includes a direct current combiner box 10, a direct current combiner box 11, . . . , a direct current combiner box 1n, and an inverter 20. An input terminal of the direct current combiner box 10 is connected to a direct current power supply 1001, a direct current power supply 1002, . . . , and a direct current power supply 100a, an input terminal of the direct current combiner box 11 is connected to a direct current power supply 1101, a direct current power supply 1102, . . . , and a direct current power supply 110b, . . . , and an input terminal of the direct current combiner box 1n is connected to a direct current power supply 1n01, a direct current power supply 1n02, . . . , and a direct current power supply 1n0x. A negative output terminal of the direct current combiner box 10 is connected to a positive output terminal of the direct current combiner box 11, . . . , a negative output terminal of the direct current combiner box 1(n−1) is connected to a positive output terminal of the direct current combiner box 1n, a positive output terminal of the direct current combiner box 10 is connected to a positive input terminal of the inverter 20, a negative output terminal of the direct current combiner box 1n is connected to a negative output terminal of the inverter 20, and an output terminal of the inverter 20 is connected to an alternating current power grid.

Because all the direct current combiner boxes in the power supply system 1 have a same structure and a same output voltage control manner, the following uses the direct current combiner box 10 as an example for description. The direct current combiner box 10 includes a direct current conversion circuit 101, a detection circuit 102, and a controller 103. An input terminal of the direct current conversion circuit 101 is coupled to the input terminal of the direct current combiner box 10, and an output terminal of the direct current conversion circuit 101 is coupled to an output terminal of the direct current combiner box 10 through the detection circuit 102.

The controller 103 may determine a connection relationship between the direct current combiner box 10 and another direct current combiner box (corresponding to the direct current combiner box 11, . . . , or the direct current combiner box 1n) in the power supply system 1 or the inverter 20 based on an output terminal parameter of the direct current combiner box 10, and control an output voltage of the direct current conversion circuit 101 based on the connection relationship.

In an optional embodiment, when the input terminal of the direct current combiner box 10 supplies power, the controller 103 starts working, and controls the output voltage of the direct current conversion circuit 101 to be a first preset voltage, where the first preset voltage includes a direct current voltage, an alternating current voltage, or a direct current voltage and an alternating current voltage. The first preset voltage may be less than or equal to a safe voltage of a human body, for example, 36 V. Then, when the output voltage of the direct current conversion circuit 101 is the first preset voltage, the controller 103 sends an output current sampling signal to the detection circuit 102. The detection circuit 102 collects an output terminal current of the direct current combiner box 10 based on the output current sampling signal, and returns the output terminal current of the direct current combiner box 10 to the controller 103. The controller 103 determines a ratio of the first preset voltage to the output terminal current of the direct current combiner box 10 as an output impedance value of the direct current combiner box 10, compares the output impedance value of the direct current combiner box 10 with a preset output impedance threshold, and when the output impedance value of the direct current combiner box 10 is greater than the preset output impedance threshold, determines that the direct current combiner box 10 is connected to the inverter 20, and controls the output voltage of the direct current conversion circuit 101 to be adjusted from the first preset voltage to a second preset voltage, where the second preset voltage is greater than the first preset voltage.

In another optional embodiment, when the input terminal of the direct current combiner box 10 supplies power, the controller 103 starts working, and controls an output current of the direct current conversion circuit 101 to be a first preset current, where the first preset current includes a direct current, an alternating current, or a direct current and an alternating current. The first preset current may be less than or equal to a safe current of a human body, or when the output current of the direct current conversion circuit 101 is the first preset current, the input voltage of the direct current conversion circuit 101 is less than or equal to a safe voltage of a human body. Then, when the output current of the direct current conversion circuit 101 is the first preset current, the controller 103 sends an output voltage sampling signal to the detection circuit 102. The detection circuit 102 collects an output terminal voltage of the direct current combiner box 10 based on the output voltage sampling signal, and returns the output terminal voltage of the direct current combiner box 10 to the controller 103. The controller 103 determines a ratio of the output terminal voltage of the direct current combiner box 10 to the first preset current as an output impedance value of the direct current combiner box 10, compares the output impedance value of the direct current combiner box 10 with a preset output impedance threshold, and when the output impedance value of the direct current combiner box is greater than the preset output impedance threshold, determines that the direct current combiner box 10 is connected to the inverter 20, and controls the output voltage of the direct current conversion circuit 101 to be a second preset voltage.

Further, the controller 103 may control the direct current conversion circuit 101 to output the first preset voltage that is a direct current voltage and an alternating current voltage, and the detection circuit 102 detects the output terminal current of the direct current combiner box 10 when the output voltage of the direct current conversion circuit 101 is the first preset voltage, to effectively detect a resistive impedance value, a capacitive impedance value, and an inductive impedance value at the output terminal of the direct current combiner box 10. Alternatively, the controller 103 may control the direct current conversion circuit 101 to output the first preset current that is a direct current and an alternating current, and the detection circuit 102 detects the output terminal voltage of the direct current combiner box 10 when the output current of the direct current conversion circuit 101 is the first preset current, to effectively detect a resistive impedance value, a capacitive impedance value, and an inductive impedance value at the output terminal of the direct current combiner box 10. When an output impedance value of a single direct current combiner box and an input impedance value of the inverter 20 are known, the controller 103 may determine, based on the calculated output impedance value of the direct current combiner box 10, whether the output terminal of the direct current combiner box 10 is connected to another direct current combiner box and the inverter 20, and may further determine a connection relationship between each direct current combiner box in the power supply system 1 in which the direct current combiner box 10 is located and each inverter 20.

In this embodiment, the controller 103 may determine a connection relationship between the direct current combiner box 10 and the direct current combiner box 11, . . . , the direct current combiner box 1n, and the inverter 20 based on the calculated output impedance value of the direct current combiner box 10, and control the output voltage of the direct current conversion circuit 101 based on the connection relationship, to ensure that the direct current combiner box 10 can start and work normally even if it is difficult to communicate with the inverter 20, thereby improving stability of the power supply system 1 and having high applicability.

Based on the power supply system 1 shown in FIG. 5, the embodiments may further provide a method for controlling an output voltage of a direct current combiner box, including:

The controller 103 controls the output voltage of the direct current conversion circuit 101 to be a first preset voltage, determines an output impedance value of the direct current combiner box based on an output terminal current of the direct current combiner box 10 and the first preset voltage, and when the output impedance value of the direct current combiner box 10 is greater than a preset output impedance threshold, controls the output voltage of the direct current conversion circuit 101 to be a second preset voltage, where the output terminal current of the direct current combiner box 10 is detected by the detection circuit 102 when the output voltage of the direct current conversion circuit 101 is the first preset voltage.

Alternatively, the controller 103 controls an output current of the direct current conversion circuit 101 to be a first preset current, determines an output impedance value of the direct current combiner box 10 based on an output terminal voltage of the direct current combiner box 10 and the first preset current, and when the output impedance value of the direct current combiner box 10 is greater than a preset output impedance threshold, controls the output voltage of the direct current conversion circuit 101 to be a second preset voltage, where the output terminal voltage of the direct current combiner box 10 is detected by the detection circuit 102 when the output current of the direct current conversion circuit 101 is the first preset current.

In another optional embodiment, when the input terminal of the direct current combiner box 10 supplies power, an input voltage or an input current of the direct current combiner box 10 is not 0, and the controller 103 starts working, and sends an output voltage and current sampling signal to the detection circuit 102. The detection circuit 102 collects an output terminal voltage and an output terminal current of the direct current combiner box 10 based on the output voltage and current sampling signal, and returns the output terminal voltage and the output terminal current of the direct current combiner box 10 to the controller 103.

The controller 103 determines whether the output terminal voltage of the direct current combiner box 10 meets a preset output voltage range (that is, greater than 0 and less than or equal to a first preset voltage). When the output terminal voltage of the direct current combiner box 10 meets the preset output voltage range, it indicates that the direct current combiner box 10 is connected to another direct current combiner box in the power supply system 1, and the another direct current combiner box connected to the direct current combiner box 10 has started to output the first preset voltage, and therefore the direct current combiner box 10 does not need to output the first preset voltage. In this case, the controller 103 determines a ratio of the output terminal voltage of the direct current combiner box 10 to the output terminal current of the direct current combiner box 10 as an output impedance value of the direct current combiner box 10, and when the output impedance value of the direct current combiner box 10 is greater than a preset output impedance threshold, controls the output voltage of the direct current conversion circuit 101 to be adjusted to a second preset voltage.

Optionally, the controller 103 determines whether the output terminal current of the direct current combiner box 10 meets a preset output current range (that is, greater than 0 and less than or equal to a first preset current). When the output terminal current of the direct current combiner box 10 meets the preset output current range, it indicates that the direct current combiner box 10 is connected to another direct current combiner box in the power supply system 1, and the another direct current combiner box connected to the direct current combiner box 10 has started to output the first preset current, and therefore the direct current combiner box 10 does not need to output the first preset current. In this case, the controller 103 determines a ratio of the output terminal voltage of the direct current combiner box 10 to the output terminal current of the direct current combiner box 10 as an output impedance value of the direct current combiner box 10, and when the output impedance value of the direct current combiner box 10 is greater than a preset output impedance threshold, controls the output voltage of the direct current conversion circuit 101 to be adjusted to a second preset voltage.

In this embodiment, the controller 103 does not need to output the first preset voltage when the output terminal voltage of the direct current combiner box 10 meets the preset output voltage range or does not need to output the first preset current when the output terminal current of the direct current combiner box 10 meets the preset output current range. Then, the controller 103 may determine a connection relationship between the direct current combiner box 10 and the direct current combiner box 11, . . . , the direct current combiner box 1$n$, and the inverter 20 based on the output terminal voltage and the output terminal current of the direct current combiner box 10, and control the output voltage of the direct current conversion circuit 101 based on the connection relationship, to cope with a case in which another direct current combiner box has started to output a voltage or a current. This avoids a conflict with the voltage or the current output by the another direct current combiner box if the direct current combiner box 10 outputs a voltage or a current again, to ensure that the direct current combiner box 10 can start and work normally even if it is difficult to communicate with the inverter 20 and the another connected direct current combiner box, thereby improving stability of the power supply system 1 and having high applicability.

Based on the power supply system 1 shown in FIG. 5, the embodiments may further provide a method for controlling an output voltage of a direct current combiner box, including:

When an output terminal voltage of the direct current combiner box 10 meets a preset output voltage range or an output terminal current of the direct current combiner box 10 meets a preset output current range, an output impedance value of the direct current combiner box 10 is determined based on the output terminal voltage and the output terminal current of the direct current combiner box 10, and when the output impedance value of the direct current combiner box 10 is greater than a preset output impedance threshold, the output voltage of the direct current conversion circuit 101 is controlled to be a second preset voltage, where the output terminal voltage and the output terminal current of the direct current combiner box 10 are detected by the detection circuit 102 when an input parameter of the direct current combiner box 10 is not a preset input parameter value.

In another optional embodiment, when the input terminal of the direct current combiner box 10 supplies power, an input voltage or an input current of the direct current combiner box 10 is not 0, and the controller 103 starts working, and sends an output residual current sampling signal to the detection circuit 102. The detection circuit 102 collects an output residual current of the direct current combiner box 10 based on the output residual current sampling signal, and returns the output residual current of the direct current combiner box 10 to the controller 103. The controller 103 compares the output residual current of the direct current combiner box 10 with a preset residual current threshold, and when the output residual current of the direct current combiner box 10 is greater than the preset residual current threshold, determines that the direct current combiner box 10 is connected to the inverter 20, and controls the output voltage of the direct current conversion circuit 101 to be a second preset voltage.

In this embodiment, the controller 103 may determine a connection relationship between the direct current combiner box 10 and the inverter 20 based on the output residual current of the direct current combiner box 10, and control the output voltage of the direct current conversion circuit 101 based on the connection relationship, to ensure that the direct current combiner box 10 can start and work normally even if it is difficult to communicate with the inverter 20, thereby improving stability of the power supply system 1 and having high applicability.

Based on the power supply system 1 shown in FIG. 5, the embodiments may further provide a method for controlling an output voltage of a direct current combiner box, including:

When an output residual current of the direct current combiner box 10 is greater than a preset residual current threshold, the controller 103 controls the output voltage of the direct current conversion circuit 101 to be a second preset voltage, where the output residual current of the direct current combiner box 10 is detected by the detection circuit 102 when an input parameter of the direct current combiner box 10 is not a preset input parameter value.

In another optional embodiment, when the input terminal of the direct current combiner box 10 supplies power, an input voltage or an input current of the direct current combiner box 10 is not 0, and the controller 103 starts working, and sends an output voltage sampling signal to the detection circuit 102. The detection circuit 102 collects an output terminal voltage of the direct current combiner box 10 based on the output voltage sampling signal, and returns the output terminal voltage of the direct current combiner box 10 to the controller 103.

The controller 103 determines whether the output terminal voltage of the direct current combiner box 10 is greater than a preset output voltage threshold, where the preset output voltage threshold is greater than a first preset voltage. When the output terminal voltage of the direct current combiner box 10 is greater than the preset output voltage threshold, it indicates that the direct current combiner box 10 is connected to another direct current combiner box in the power supply system 1, and the another direct current combiner box connected to the direct current combiner box 10 has started. In this case, the controller 103 controls the output voltage of the direct current conversion circuit 101 to be adjusted to the output terminal voltage of the direct current combiner box 10, that is, controls the output voltage of the direct current conversion circuit 101 to follow the output terminal voltage of the direct current combiner box 10.

In this embodiment, when the output terminal voltage of the direct current combiner box 10 is greater than the preset output voltage threshold, the controller 103 may determine that the another direct current combiner box connected to the direct current combiner box 10 has started, and control the output voltage of the direct current conversion circuit 101 to follow the output terminal voltage of the direct current combiner box 10, to avoid a current surge caused by an excessively high output terminal voltage when the direct current combiner box 10 is not started, and ensure that the direct current combiner box 10 can start and work normally even if it is difficult to communicate with the inverter 20 and the another connected direct current combiner box, thereby improving stability of the power supply system 1 and having high applicability.

Based on the power supply system 1 shown in FIG. 5, the embodiments may further provide a method for controlling an output voltage of a direct current combiner box, including:

An output terminal parameter of the direct current combiner box 10 includes an output terminal voltage of the direct current combiner box 10.

When the output terminal voltage of the direct current combiner box 10 is greater than a preset output voltage threshold, the controller 103 controls the output voltage of the direct current conversion circuit 101 to be the output terminal voltage of the direct current combiner box 10, where the output terminal voltage of the direct current combiner box 10 is detected by the detection circuit 102 when an input parameter of the direct current combiner box 10 is not a preset input parameter value.

In still another optional embodiment, when the input terminal of the direct current combiner box 10 supplies power, an input voltage or an input current of the direct current combiner box 10 is not 0, and the controller 103 starts working, and sends an output current and voltage sampling signal to the detection circuit 102. The detection circuit 102 collects an output terminal current and an output terminal voltage of the direct current combiner box 10 based on the output current and voltage sampling signal, and returns the output terminal current and the output terminal voltage of the direct current combiner box 10 to the controller 103.

The controller 103 determines whether the output terminal current of the direct current combiner box 10 is greater than a preset output current threshold, where the preset output current threshold is greater than a first preset current. When the output terminal current of the direct current combiner box 10 is greater than the preset output current threshold, it indicates that the direct current combiner box 10 is connected to another direct current combiner box in the power supply system 1, and the another direct current combiner box connected to the direct current combiner box 10 has started. In this case, the controller 103 controls the output voltage of the direct current conversion circuit 101 to be adjusted to the output terminal voltage of the direct current combiner box 10, that is, controls the output voltage of the direct current conversion circuit 101 to follow the output terminal voltage of the direct current combiner box 10.

In this embodiment, when the output terminal current of the direct current combiner box is greater than the preset output current threshold, the controller 103 may determine that the another direct current combiner box connected to the direct current combiner box 10 has started, and control the output voltage of the direct current conversion circuit 101 to follow the output terminal voltage of the direct current combiner box 10, to avoid a current surge caused by an excessively high output terminal current when the direct current combiner box 10 is not started, and ensure that the direct current combiner box 10 can start and work normally even if it is difficult to communicate with the inverter 20 and the another connected direct current combiner box, thereby improving stability of the power supply system 1 and having high applicability.

Based on the power supply system 1 shown in FIG. 5, the embodiments may further provide a method for controlling an output voltage of a direct current combiner box, including:

An output terminal parameter of the direct current combiner box 10 includes an output terminal current and an output terminal voltage of the direct current combiner box 10.

When the output terminal current of the direct current combiner box 10 is greater than a preset output current threshold, the controller 103 controls the output voltage of the direct current conversion circuit 101 to be the output terminal voltage of the direct current combiner box 10, where the output terminal current and the output terminal voltage of the direct current combiner box 10 are detected by the detection circuit 102 when an input parameter of the direct current combiner box 10 is not a preset input parameter value.

Figure 6:
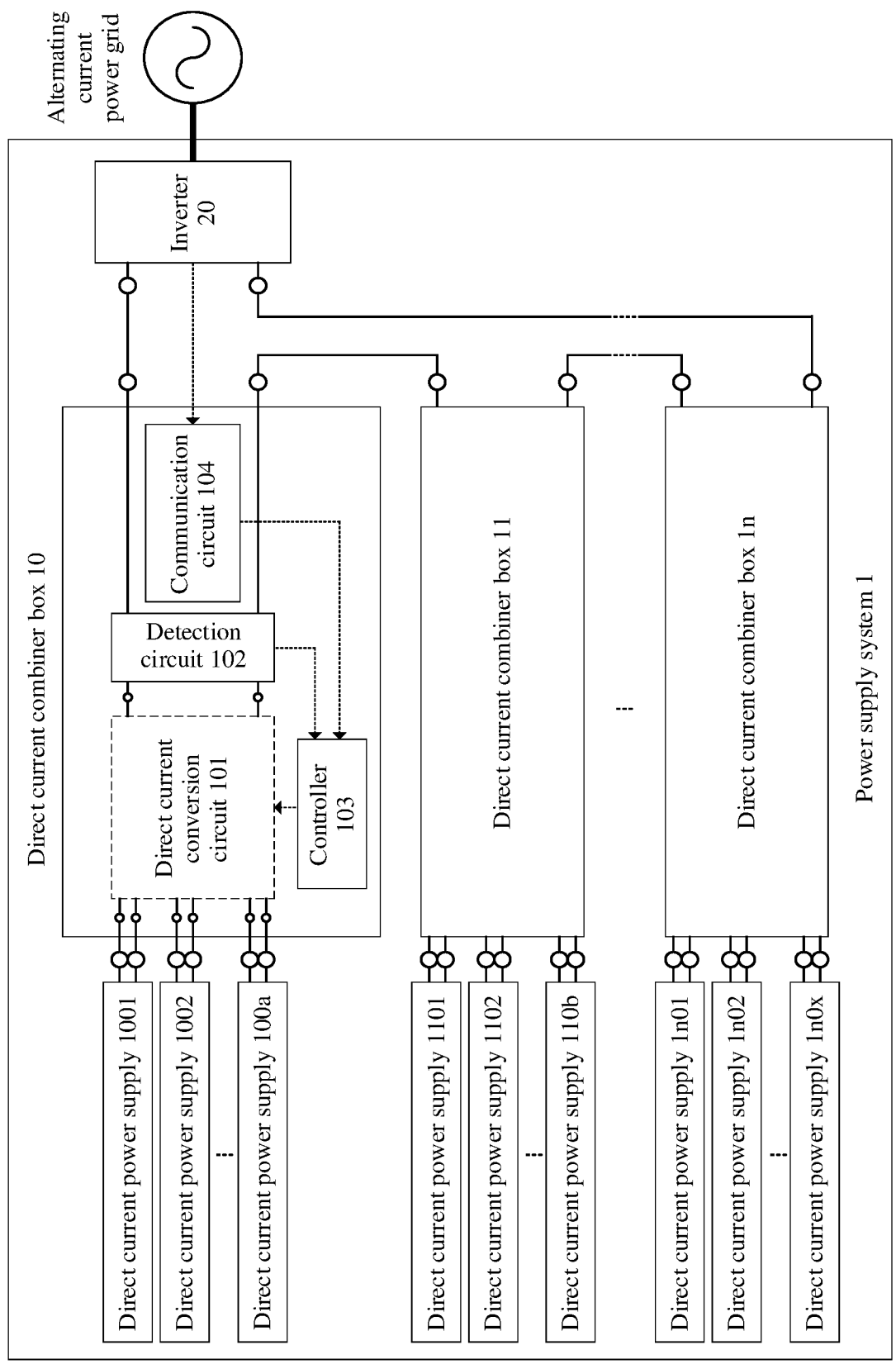
FIG. 6 is another schematic diagram of a structure of a power supply system in which output terminals of direct current combiner boxes are connected in series.

Further, each direct current combiner box in the power supply system 1 shown in FIG. 5 may further include a communication circuit. For details, refer to another schematic diagram of a structure of a power supply system shown in FIG. 6. As shown in FIG. 6, the direct current combiner box 10 further includes a communication circuit 104, configured to: receive an instruction sent by the inverter 20, and send the instruction to the controller 103. A communication manner between the communication circuit 104 and the inverter 20 may be power cable communication, dedicated wired communication, or wireless communication.

In an optional embodiment, when the input terminal of the direct current combiner box 10 supplies power, the controller 103 starts working, controls the output voltage of the direct current conversion circuit 101 to be a first preset voltage, and sends an output current sampling signal to the detection circuit 102 when the output voltage of the direct current conversion circuit 101 is the first preset voltage. The detection circuit 102 collects an output terminal current of the direct current combiner box 10 based on the output current sampling signal, and sends the output terminal current of the direct current combiner box 10 to the controller 103. The controller 103 determines an output impedance value of the direct current combiner box 10 based on the output terminal current of the direct current combiner box 10 and the first preset voltage, and when the output impedance value of the direct current combiner box 10 is greater than a preset output impedance threshold, controls the output voltage of the direct current conversion circuit 101 to rise from the first preset voltage to a second preset voltage.

Optionally, when the input terminal of the direct current combiner box 10 supplies power, the controller 103 starts working, controls an output current of the direct current conversion circuit 101 to be a first preset current, and sends an output voltage sampling signal to the detection circuit 102 when the output current of the direct current conversion circuit 101 is the first preset current. The detection circuit 102 collects an output terminal voltage of the direct current combiner box 10 based on the output voltage sampling signal, and sends the output terminal voltage of the direct current combiner box 10 to the controller 103. The controller 103 determines an output impedance value of the direct current combiner box 10 based on the output terminal voltage of the direct current combiner box 10 and the first preset current, and when the output impedance value of the direct current combiner box 10 is greater than a preset output impedance threshold, controls the output voltage of the direct current conversion circuit 101 to be adjusted from a first preset voltage to a second preset voltage.

Optionally, when the input terminal of the direct current combiner box 10 supplies power, an input voltage or an input current of the direct current combiner box 10 is not 0, and the controller 103 starts working, and sends an output voltage and current sampling signal to the detection circuit 102. The detection circuit 102 collects an output terminal voltage and an output terminal current of the direct current combiner box 10 based on the output voltage and current sampling signal, and returns the output terminal voltage and the output terminal current of the direct current combiner box to the controller 103. When the output terminal voltage of the direct current combiner box 10 meets a preset output voltage range or the output terminal current of the direct current combiner box meets a preset output current range, the controller 103 determines an output impedance value of the direct current combiner box 10 based on the output terminal voltage and the output terminal current of the direct current combiner box 10, and when the output impedance value of the direct current combiner box 10 is greater than a preset output impedance threshold, controls the output voltage of the direct current conversion circuit 101 to be a second preset voltage.

Optionally, when the input terminal of the direct current combiner box 10 supplies power, an input voltage or an input current of the direct current combiner box 10 is not 0, and the controller 103 starts working, and sends an output residual current sampling signal to the detection circuit 102. The detection circuit 102 collects an output residual current of the direct current combiner box 10 based on the output residual current sampling signal, and sends the output residual current of the direct current combiner box 10 to the controller 103. When the output residual current of the direct current combiner box 10 is greater than a preset output residual current threshold, the controller 103 controls the output voltage of the direct current conversion circuit 101 to be a second preset voltage.

When the direct current conversion circuit 101 outputs the second preset voltage, the input terminal of the inverter 20 obtains a voltage equal to the second preset voltage, and the voltage is set to a value that can enable an auxiliary power supply, a control unit, and a communication unit of the inverter 20 to start working. Then, the inverter 20 sends an instruction to the communication circuit 104 of the direct current combiner box 10, and the communication circuit 104 sends the instruction to the controller 103. After receiving the instruction, the controller 103 controls the output voltage of the direct current conversion circuit 101 to rise from the second preset voltage to a third preset voltage, so that the direct current combiner box 10 completes startup. The third preset voltage is generally a rated voltage of the direct current conversion circuit 101, and is greater than or equal to the second preset voltage.

In this embodiment, the controller 103 may determine a connection relationship between the direct current combiner box 10 and the inverter 20 based on the output impedance value or the output residual current of the direct current combiner box 10, and control, based on the connection relationship, the direct current conversion circuit 101 to output the second preset voltage, to ensure that the direct current combiner box 10 can start normally even if it is difficult to communicate with the inverter 20, thereby improving stability of the power supply system 1 and having high applicability. In addition, when the output voltage of the direct current conversion circuit 101 is the second preset voltage, the controller 103 no longer controls the output voltage of the direct current conversion circuit 101 to continue to rise, but continues to control, only when receiving the working instruction sent by the inverter 20, the direct current conversion circuit 101 to complete startup, thereby effectively reducing a loss of the power supply system 1 and reducing a probability of a misoperation of the power supply system 1.

Based on the power supply system 1 shown in FIG. 5, the embodiments may further provide a method for controlling an output voltage of a direct current combiner box, including:

The direct current combiner box 10 further includes a communication circuit 104, and the communication circuit 104 is configured to: receive an instruction sent by the inverter 20, and send the instruction to the controller 103.

When determining that the direct current combiner box 10 is connected to the inverter 20, the controller 103 controls the output voltage of the direct current conversion circuit 101 to be a second preset voltage, and when receiving the instruction, controls the output voltage of the direct current conversion circuit 101 to be adjusted from the second preset voltage to a third preset voltage, where the third preset voltage is greater than or equal to the second preset voltage, and the third preset voltage is a rated voltage of the direct current conversion circuit 101.

In another optional embodiment, when the input terminal of the direct current combiner box 10 supplies power, the controller 103 starts working. When the controller 103 receives, through the communication circuit 104, the instruction sent by the inverter 20, the controller 103 controls the output voltage of the direct current conversion circuit 101 to be a third preset voltage, where the third preset voltage is a rated voltage of the direct current conversion circuit 101.

In this embodiment, the inverter 20 has been supplied with a voltage by another direct current combiner box or in an additional manner such as a power grid and sends the instruction to the communication circuit 104 of the direct current combiner box 10. Therefore, after receiving the instruction, the controller 103 may directly control the output voltage of the direct current conversion circuit 101 to be the third preset voltage, so that the direct current combiner box 10 completes startup.

Figure 7:
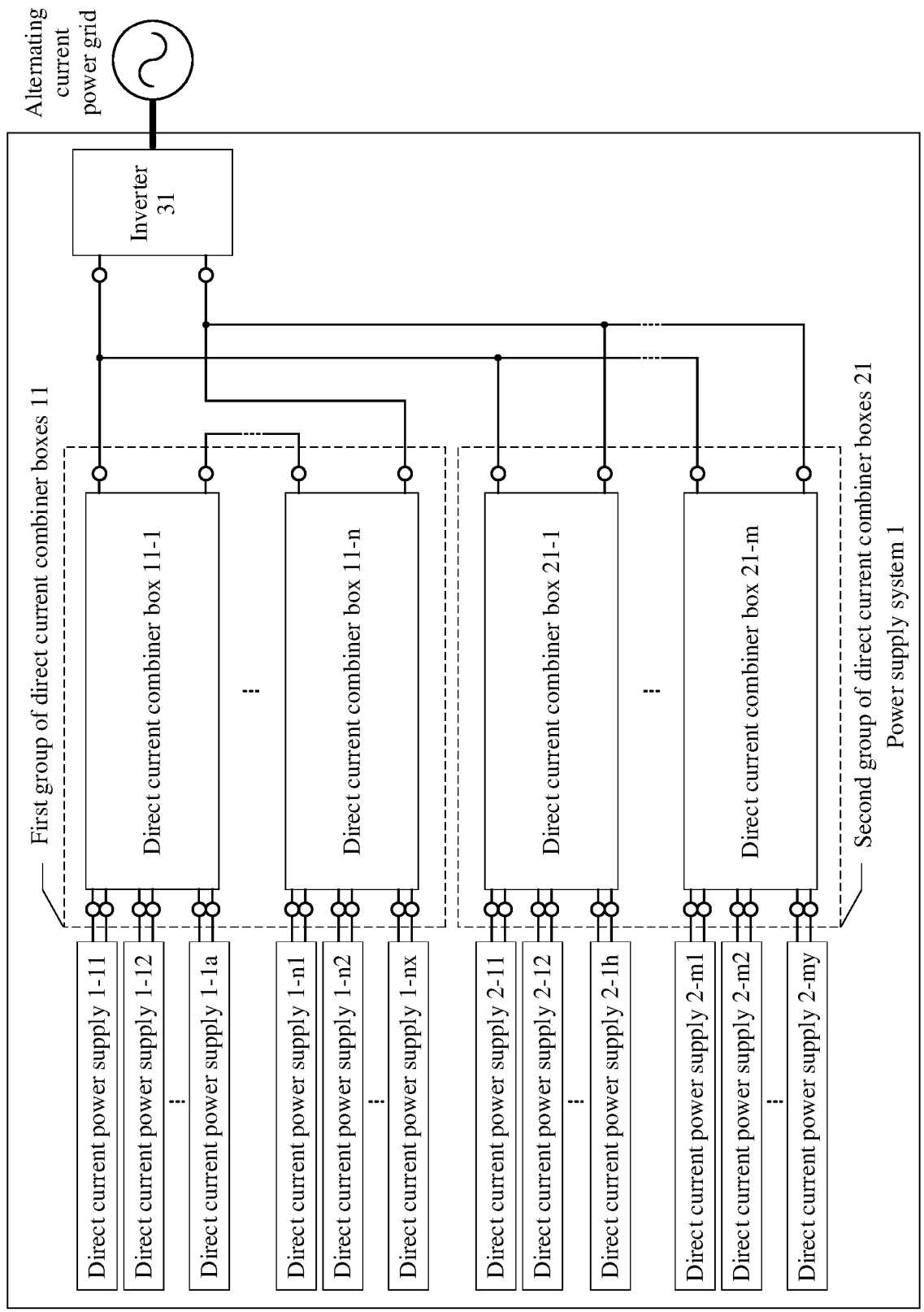
FIG. 7 is a schematic diagram of a structure of a power supply system in which output terminals of direct current combiner boxes are connected in series and in parallel.

FIG. 7 is a schematic diagram of a structure of a power supply system in which output terminals of direct current combiner boxes are connected in series and in parallel. As shown in FIG. 7, a power supply system 1 includes a first group of direct current combiner boxes 11, a second group of direct current combiner boxes 21, and an inverter 31. The first group of direct current combiner boxes 11 include a direct current combiner box 11-1, . . . , and a direct current combiner box 11-n, and the second group of direct current combiner boxes 21 include a direct current combiner box 21-1, . . . , and a direct current combiner box 21-m. A negative output terminal of the direct current combiner box 11-1 is connected to a positive output terminal of the direct current combiner box 11-2 in series, . . . , a negative output terminal of the direct current combiner box 11-(n−1) is connected to a positive output terminal of the direct current combiner box 11-n in series, a positive output terminal of the direct current combiner box 11-1 is connected to a positive input terminal of the inverter 31, and a negative output terminal of the direct current combiner box 11-n is connected to a negative input terminal of the inverter 31. Positive output terminals of the direct current combiner box 21-1, . . . , and the direct current combiner box 21-m are connected in parallel and then connected to the positive input terminal of the inverter 31, and negative output terminals of the direct current combiner box 21-1, . . . , and the direct current combiner box 21-m are connected in parallel and then connected to the negative input terminal of the inverter 31.

In this embodiment, for a structure of each direct current combiner box in the first group of direct current combiner boxes 11 and an implementation of controlling an output voltage of each direct current combiner box, refer to the structure of the direct current combiner box and the implementation of controlling an output voltage of each direct current combiner box in the embodiments shown in FIG. 5 and FIG. 6. For a structure of each direct current combiner box in the second group of direct current combiner boxes 21 and an implementation of controlling an output voltage of each direct current combiner box, refer to the structure of the direct current combiner box and the implementation of controlling an output voltage of each direct current combiner box in the embodiments shown in FIG. 1B and FIG. 3. Details are not described herein again.

It may be understood that in this embodiment, an output voltage of a direct current combiner box may be controlled based on an output terminal parameter of the direct current combiner box, to ensure that the direct current combiner box can start and work normally even if it is difficult to communicate with the inverter, thereby improving stability of the power supply system 1 and having high applicability.

It should be noted that, for any direct current combiner box in the power supply system shown in FIG. 1B to FIG. 7, after a direct current combiner box is started for the first time, a controller in the direct current combiner box may record a case in which an output terminal of the direct current combiner box is connected to another direct current combiner box or an inverter. Generally, a connection between direct current combiner boxes and a connection between the direct current combiner box and the inverter do not change after the power supply system is installed. Therefore, when any direct current combiner box is started for the second time and is started later, the controller in the direct current combiner box may enable the direct current combiner box to complete startup based on a recorded output terminal connection status. When the power supply system is faulty or maintained, the power supply system needs to be reset, and a controller in any direct current combiner box in the power supply system may be started in a manner of starting the direct current combiner box for the first time (that is, a startup manner of the direct current combiner box in the embodiments shown in FIG. 1B to FIG. 7).

The controller determines a connection relationship between the direct current combiner box and another direct current combiner box in the power supply system or the inverter based on the output terminal parameter of the direct current combiner box, and then may control an output voltage of the direct current conversion circuit based on the connection relationship, to ensure that the direct current combiner box can start and work normally even if it is difficult to communicate with the inverter, thereby improving stability of the power supply system and having high applicability.

The foregoing descriptions are merely implementations, but are not intended as limiting. Any variation or replacement readily figured out by a person skilled in the art shall fall within the scope of the embodiments.

What is claimed is:

1. A power supply system comprising:
   a direct current combiner box' and
   an inverter, wherein output terminals the direct current combiner box are coupled to an input terminal of the inverter, an input terminal of the direct current combiner box is connected to a direct current power supply, and the direct current combiner box comprises:
a controller, and
a direct current conversion circuit, wherein an input terminal of the direct current conversion circuit is coupled to the input terminal of the direct current combiner box, an output terminal of the direct current conversion circuit is coupled to the output terminal of the direct current combiner box, and the direct current conversion circuit is configured to perform direct current conversion on an input terminal voltage of the direct current combiner box to obtain an output terminal voltage of the direct current combiner box, and the controller is configured to control an output voltage of the direct current conversion circuit based on the output terminal parameter of the direct current combiner box.

2. The power supply system according to claim 1, wherein the the controller is further configured to:
control the output voltage of the direct current conversion circuit to be a first preset voltage; and
determine an output impedance value of the direct current combiner box based on an output terminal current of the direct current combiner box and the first preset voltage, and
when the output impedance value of the direct current combiner box is greater than a preset output impedance threshold, control the output voltage of the direct current conversion circuit to be a second preset voltage, wherein the second preset voltage is greater than the first preset voltage.

3. The power supply system according to claim 2, wherein the first preset voltage comprises a direct current voltage.

4. The power supply system according to claim 1, wherein the controller is further configured to:
control the output current of the direct current conversion circuit to be a first preset current; and
determine an output impedance value of the direct current combiner box based on the output terminal voltage of the direct current combiner box and the first preset current, and
when the output impedance value of the direct current combiner box is greater than a preset output impedance threshold, control the output voltage of the direct current conversion circuit to be a second preset voltage.

5. The power supply system according to claim 4, wherein the first preset current comprises a direct current.

6. The power supply system according to claim 1, wherein the controller is further configured to:
when the output terminal voltage of the direct current combiner box meets a preset output voltage range or the output terminal current of the direct current combiner box meets a preset output current range, determine an output impedance value of the direct current combiner box based on the output terminal voltage and the output terminal current of the direct current combiner box, and
when the output impedance value of the direct current combiner box is greater than a preset output impedance threshold, control the output voltage of the direct current conversion circuit to be a second preset voltage.

7. The power supply system according to claim 6, wherein the output terminal voltage of the direct current combiner box comprises a direct current voltage, and the output terminal current of the direct current combiner box comprises a direct current.

8. The power supply system according to claim 1, wherein the controller is further configured to:
when the output residual current of the direct current combiner box is greater than a preset residual current threshold, control the output voltage of the direct current conversion circuit to be a second preset voltage.

9. The power supply system according to claim 2, wherein the direct current combiner box further comprises:
a communication circuit configured to:
receive an instruction sent by the inverter, and
send the instruction to the controller; and the controller is further configured to:
when receiving the instruction, control the output voltage of the direct current conversion circuit to be a third preset voltage, wherein the third preset voltage is greater than or equal to the second preset voltage, and the third preset voltage is a rated voltage of the direct current conversion circuit.

10. The power supply system according to claim 2, wherein the direct current conversion circuit further comprises:
a power conversion circuit,
a voltage regulation circuit, and
a breaking switch, wherein an output voltage of the power conversion circuit is greater than an output voltage of the voltage regulation circuit, an input terminal of the power conversion circuit is coupled to the input terminal of the direct current conversion circuit through the breaking switch, and an output terminal of the power conversion circuit is coupled to the output terminal of the direct current conversion circuit; and an input terminal of the voltage regulation circuit is coupled to the input terminal of the direct current conversion circuit, and an output terminal of the voltage regulation circuit is coupled to the output terminal of the direct current conversion circuit; and the controller is further configured to:
control the breaking switch to be turned off, and
control the output voltage of the voltage regulation circuit to be the first preset voltage.

11. The power supply system according to claim 1, wherein the controller is further configured to:
when the output terminal voltage of the direct current combiner box is greater than a preset output voltage threshold, control the output voltage of the direct current conversion circuit to be the output terminal voltage of the direct current combiner box.

12. The power supply system according to claim 1, wherein the controller is further configured to:
when the output terminal current of the direct current combiner box is greater than a preset output current threshold, control the output voltage of the direct current conversion circuit to be the output terminal voltage of the direct current combiner box.

13. The power supply system according to claim 1, wherein the inverter comprises:
a first inverter, and
a second inverter; and further comprising:
a first group of direct current combiner boxes, and
a second group of direct current combiner boxes, wherein the first group of direct current combiner boxes and the second group of direct current combiner boxes each comprise at least one direct current combiner box, output terminals of all direct current combiner boxes in the first group of direct current combiner boxes are connected in parallel, and output terminals of all direct current combiner boxes in the second group of direct current combiner boxes are connected in parallel; first output terminals of all the direct current combiner boxes in the first group of direct current combiner boxes are coupled to form a first node; the first node is connected to a first input terminal of the first inverter through a first wire; second output terminals of all the direct current combiner boxes in the first group of direct current combiner boxes are coupled to first output terminals of all the direct current combiner boxes in the second group of direct current combiner boxes to form a second node; second output terminals of all the direct current combiner boxes in the second group of direct current combiner boxes are coupled to form a third node; the third node is connected to a second input terminal of the second inverter through a second wire; a second input terminal of the first inverter is coupled to a first input terminal of the second inverter to form a fourth node; and the fourth node is connected to the second node through a third wire, wherein both a through-current capability of the first wire and a through-current capability of the second wire are greater than or equal to a through-current capability of the third wire.

14. The power supply system according to claim 13, wherein output voltages of the first group of direct current combiner boxes in a maintenance mode are different from output voltages of the second group of direct current combiner boxes in a maintenance mode, output voltages of all the direct current combiner boxes in the first group of direct current combiner boxes in a maintenance mode are the same, and output voltages of all the direct current combiner boxes in the second group of direct current combiner boxes in a maintenance mode are the same.

15. The power supply system according to claim 1, wherein the direct current power supply comprises a photovoltaic string.

16. A method for controlling an output voltage of a direct current combiner box, wherein the method is applied to a power supply system, the power supply system comprises:
a direct current combiner box and
an inverter, output terminals of the direct current combiner box are coupled to an input terminal of the inverter, an input terminal of the direct current combiner box is connected to a direct current power supply, and the direct current combiner box comprises:
a controller, and
a direct current conversion circuit, wherein an input terminal of the direct current conversion circuit is coupled to the input terminal of the direct current combiner box, and an output terminal of the direct current conversion circuit is coupled to the output terminal of the direct current combiner box, and the method comprises:
performing, by the direct current conversion circuit, direct current conversion on an input terminal voltage of the direct current combiner box to obtain an output terminal voltage of the direct current combiner box;
sending an output terminal parameter of the direct current combiner box to the controller; and
controlling, by the controller, an output voltage of the direct current conversion circuit based on the output terminal parameter of the direct current combiner box.

17. The method according to claim 16, further comprising:
controlling the output voltage of the direct current conversion circuit to be a first preset voltage;
determining an output impedance value of the direct current combiner box based on an output terminal current of the direct current combiner box and the first preset voltage, and
when the output impedance value of the direct current combiner box is greater than a preset output impedance threshold, controlling the output voltage of the direct current conversion circuit to be a second preset voltage, wherein the second preset voltage is greater than the first preset voltage.

18. The method according to claim 17, wherein the first preset voltage comprises a direct current voltage.

19. The method according to claim 16, further comprising:
controlling an output current of the direct current conversion circuit to be a first preset current; and
determining an output impedance value of the direct current combiner box based on an output terminal voltage of the direct current combiner box and the first preset current, and
when the output impedance value of the direct current combiner box is greater than a preset output impedance threshold, controlling the output voltage of the direct current conversion circuit to be a second preset voltage.

20. The method according to claim 19, wherein the first preset current comprises a direct current.

* * * * *